United States Patent
Funamoto et al.

[11] Patent Number: 6,108,060
[45] Date of Patent: Aug. 22, 2000

[54] SURFACE-TYPE ILLUMINATION DEVICE AND LIQUID CRYSTAL DISPLAY

[75] Inventors: Tatsuaki Funamoto; Toru Yagasaki; Fumiaki Akahane, all of Suwa, Japan

[73] Assignee: Seiko Epson Corporation, Tokyo, Japan

[21] Appl. No.: 09/321,687

[22] Filed: May 28, 1999

Related U.S. Application Data

[62] Division of application No. 08/689,424, Aug. 9, 1996, Pat. No. 5,949,505, which is a division of application No. 08/204,374, May 10, 1994, Pat. No. 5,619,351.

[30] Foreign Application Priority Data

May 13, 1993 [JP] Japan ................................. 5-111852

[51] Int. Cl.[7] ......................... G02F 1/1335; G01D 11/28; F21V 7/04
[52] U.S. Cl. ............................... 349/65; 362/26; 362/27; 362/31
[58] Field of Search ........................ 349/65, 70; 362/26, 362/27, 31

[56] References Cited

U.S. PATENT DOCUMENTS

| | | | |
|---|---|---|---|
| 3,892,959 | 7/1975 | Pulles | 362/31 |
| 3,968,584 | 7/1976 | Kingston | 362/31 |
| 4,568,179 | 2/1986 | Durbin et al. | 362/343 |
| 4,630,895 | 12/1986 | Abdala, Jr. et al. | 362/31 |
| 4,648,690 | 3/1987 | Ohe | 362/31 |
| 4,729,067 | 3/1988 | Ohe | 362/26 |
| 4,729,068 | 3/1988 | Ohe | 362/31 |
| 4,811,507 | 3/1989 | Blanchet | 362/31 |
| 4,842,378 | 6/1989 | Flasck et al. | 362/31 |
| 4,860,171 | 8/1989 | Kojima | 362/31 |
| 4,933,814 | 6/1990 | Sanai | 362/26 |
| 4,974,122 | 11/1990 | Shaw | 362/31 |
| 4,985,809 | 1/1991 | Mitsui et al. | 362/31 |
| 5,057,974 | 10/1991 | Mizobe | 362/26 |
| 5,124,890 | 6/1992 | Choi et al. | 362/27 |
| 5,130,898 | 7/1992 | Akahane | 362/31 |
| 5,134,549 | 7/1992 | Yokoyama | 362/31 |
| 5,283,673 | 2/1994 | Murase et al. | 362/31 |
| 5,363,294 | 11/1994 | Yamamoto et al. | 362/26 |
| 5,764,493 | 6/1998 | Liao | 362/31 |
| 5,949,505 | 9/1999 | Funamoto et al. | 349/65 |

FOREIGN PATENT DOCUMENTS

| | | |
|---|---|---|
| 0 317 250 | 5/1989 | European Pat. Off. . |
| 0 442 529 | 8/1991 | European Pat. Off. . |
| 0 561 329 | 9/1993 | European Pat. Off. . |

(List continued on next page.)

OTHER PUBLICATIONS

"Advancements In Backlighting Technologies For LCDs", K. Hathaway, SPIE Proceedings, High–Resolution Displays and Projection Systems, vol. 1664, Feb. 1992, pp. 108–116.
Electronic Design, Aug. 2, 1961, p. 47.
Voltarc Technical Bulletin "Fluorescent Lamp", 1987.

*Primary Examiner*—William L. Sikes
*Assistant Examiner*—Walter Malinowski
*Attorney, Agent, or Firm*—Mark P. Watson

[57] ABSTRACT

A surface-type illumination device suitable for providing backlight in a liquid crystal display is disclosed. For example, an L-shaped fluorescent light can be used as an illuminant and mounted next to two edges of a substantially rectangular light guide plate. The corner of an edge portion between the two edges is removed. The fluorescent light, the length of whose illuminating portion is long, is positioned with an appropriate gap from the light guide plate allowing for illumination with high brightness and low power consumption. Consequently, when the illumination device is used in a color liquid crystal display, appropriate backlight with high brightness can be obtained. Moreover, because the influence of the temperature from the illumination device is small, a stable color display can be achieved.

12 Claims, 12 Drawing Sheets

FOREIGN PATENT DOCUMENTS

| | | |
|---|---|---|
| 0 587 766 | 4/1925 | France . |
| 0 145 934 | 10/1957 | France . |
| 0 327 493 | 5/1958 | France . |
| 2 620 795 | 3/1989 | France . |
| 2 632 432 | 12/1989 | France . |
| 54-40086 | 3/1979 | Japan . |
| 60-205576 | 10/1985 | Japan . |
| 61-166585 | 7/1986 | Japan . |
| 61-248079 | 11/1986 | Japan . |
| 62-102226 | 5/1987 | Japan . |
| 63-062105 | 3/1988 | Japan . |
| 63-45537 | 3/1988 | Japan . |
| 63-175301 | 7/1988 | Japan . |
| 63-124217 | 8/1988 | Japan . |
| 64-45002 | 2/1989 | Japan . |
| 64-45003 | 2/1989 | Japan . |
| 1-183626 | 7/1989 | Japan . |
| 3-15476 | 5/1991 | Japan . |
| 3-201304 | 9/1991 | Japan . |
| 4-102888 | 4/1992 | Japan . |
| 0 664 193 | 1/1952 | United Kingdom . |
| WO88/08149 | 10/1988 | WIPO . |

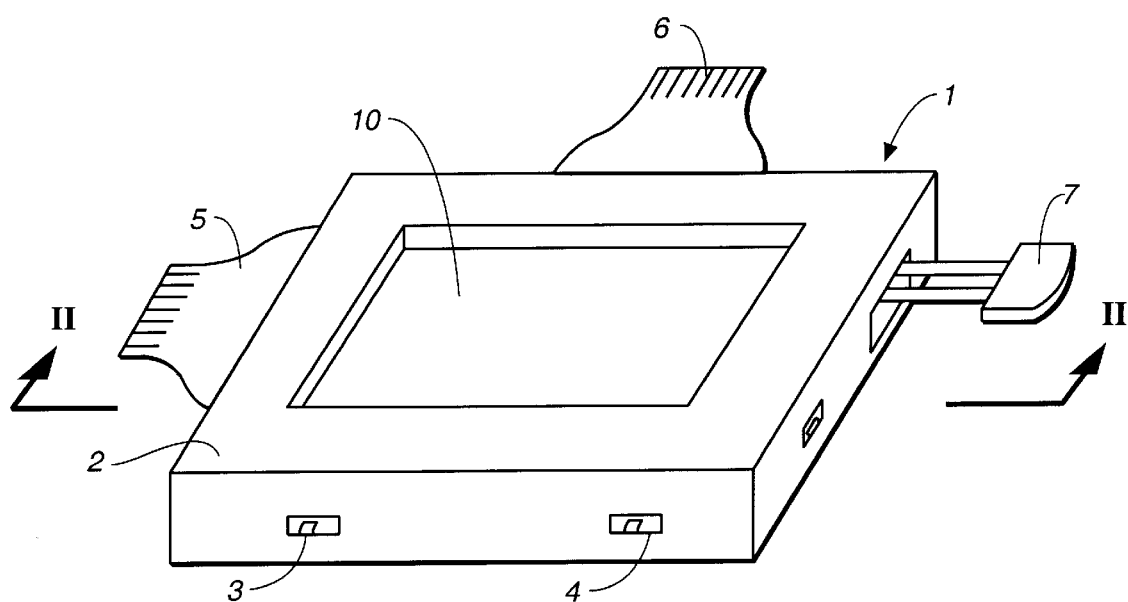
FIG._1
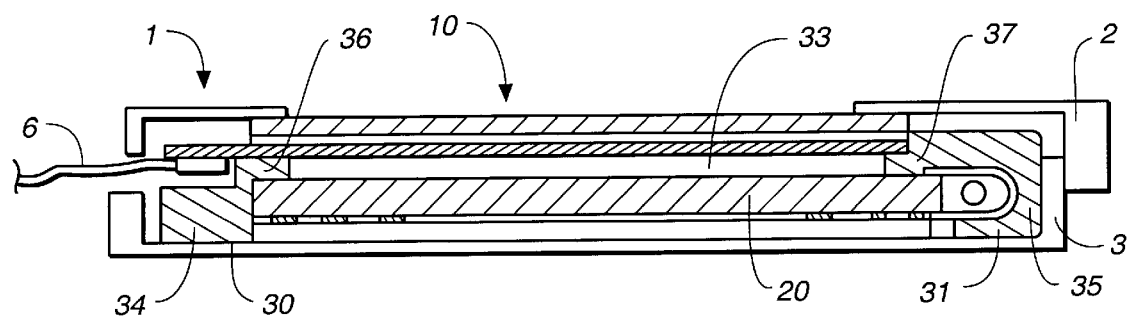
FIG._2

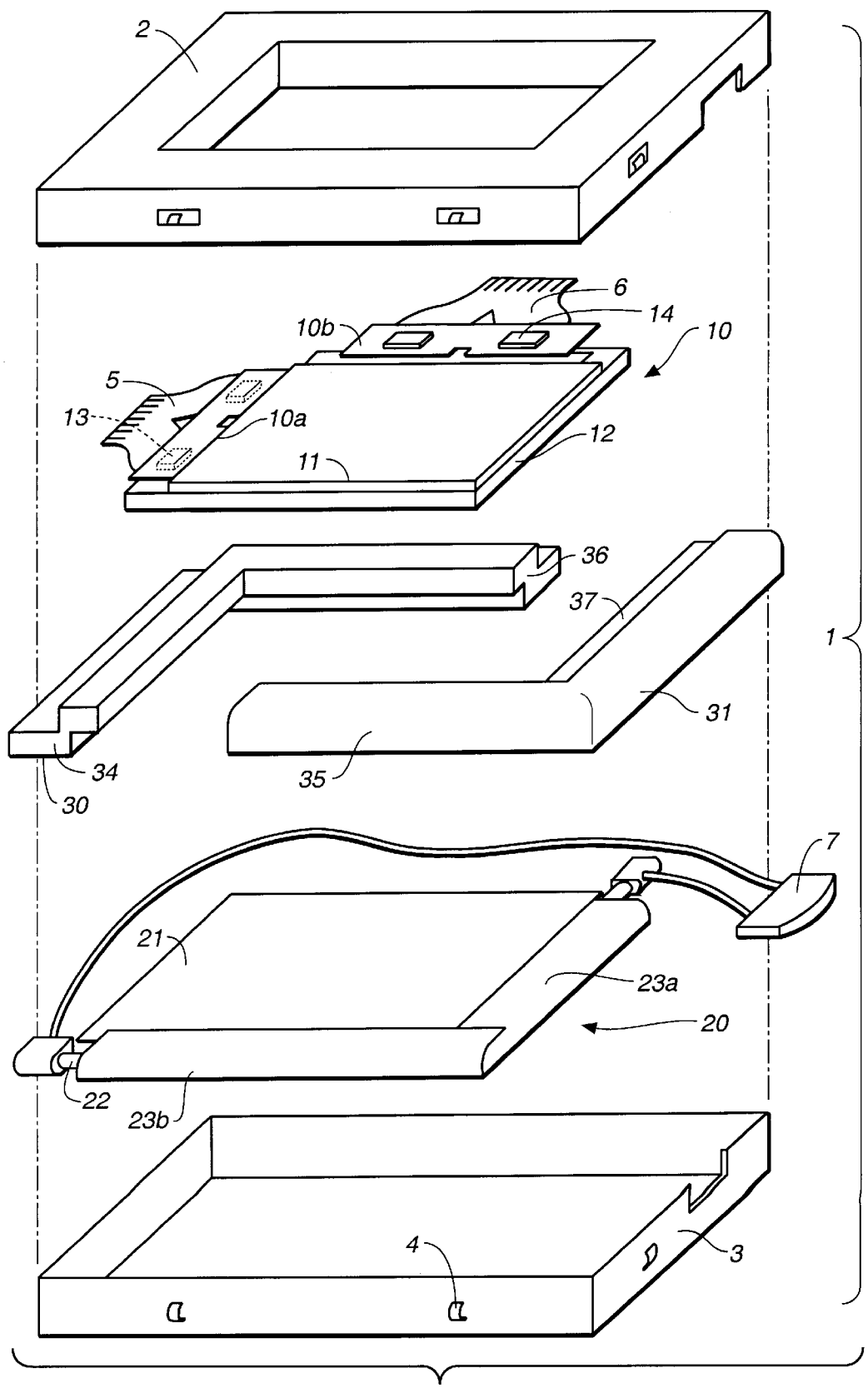
FIG._3

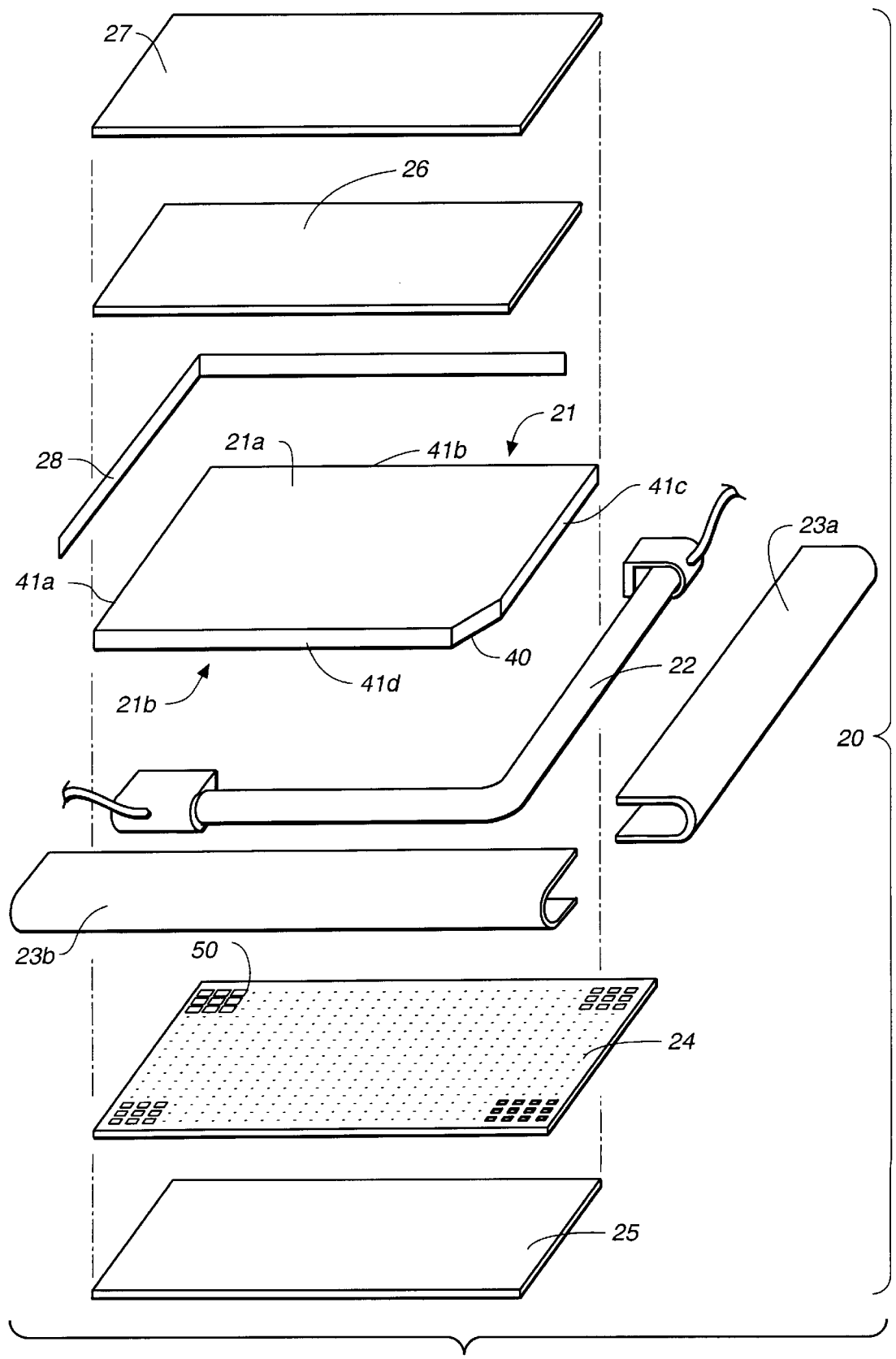
FIG._4

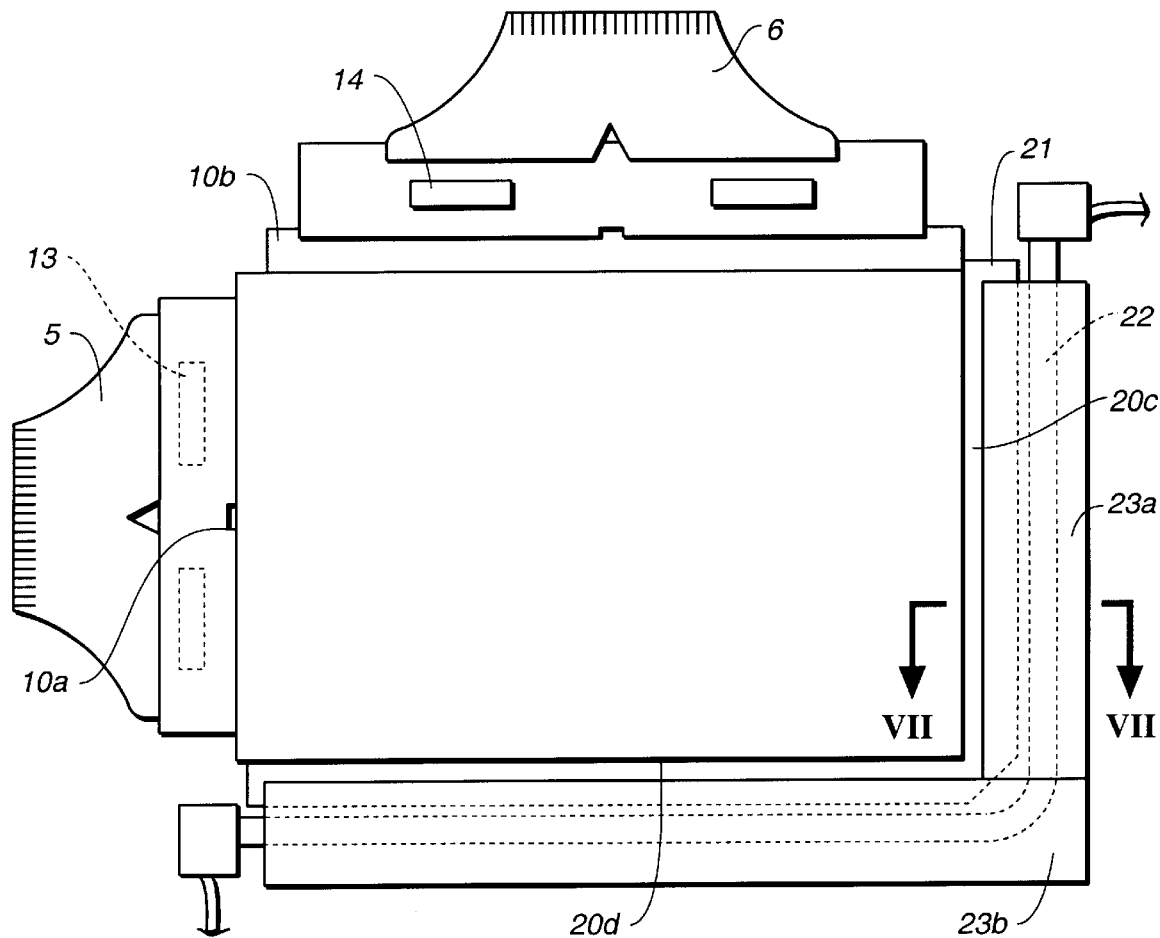
FIG._5
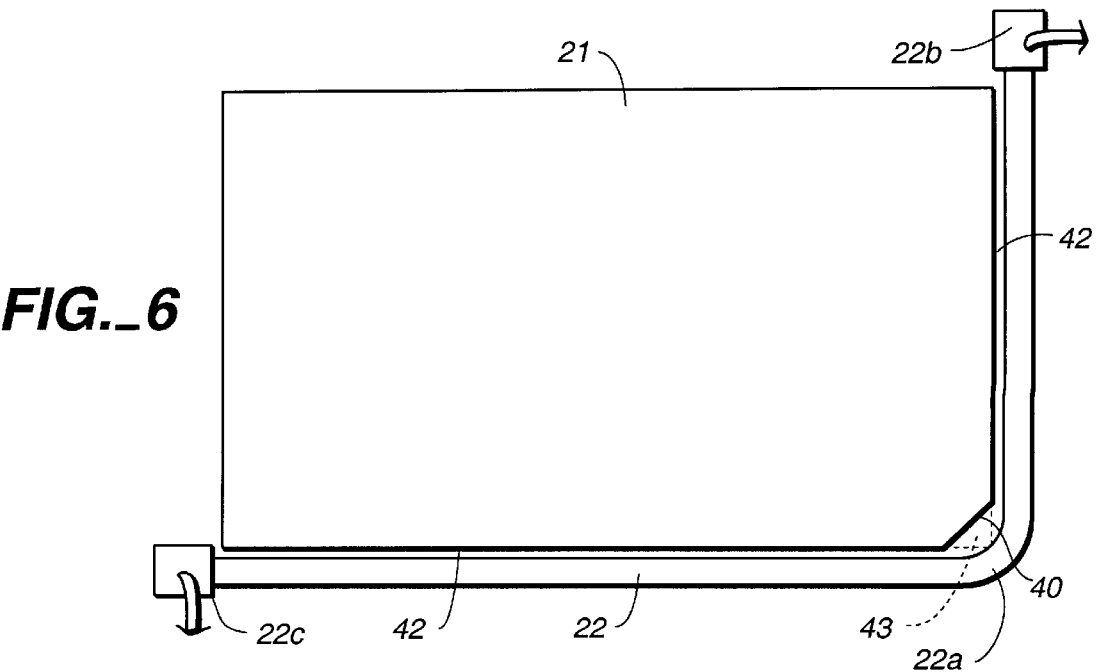
FIG._6

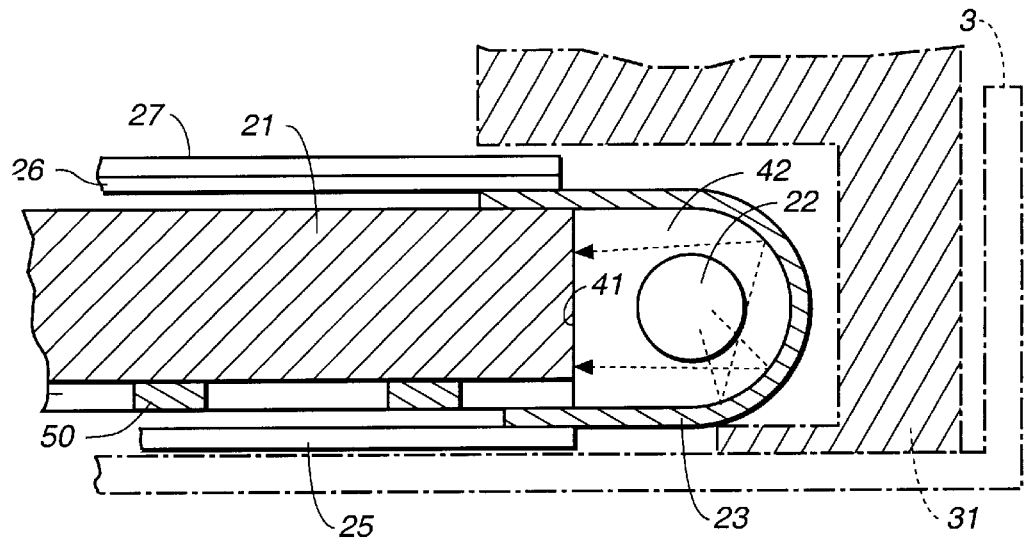
FIG._7
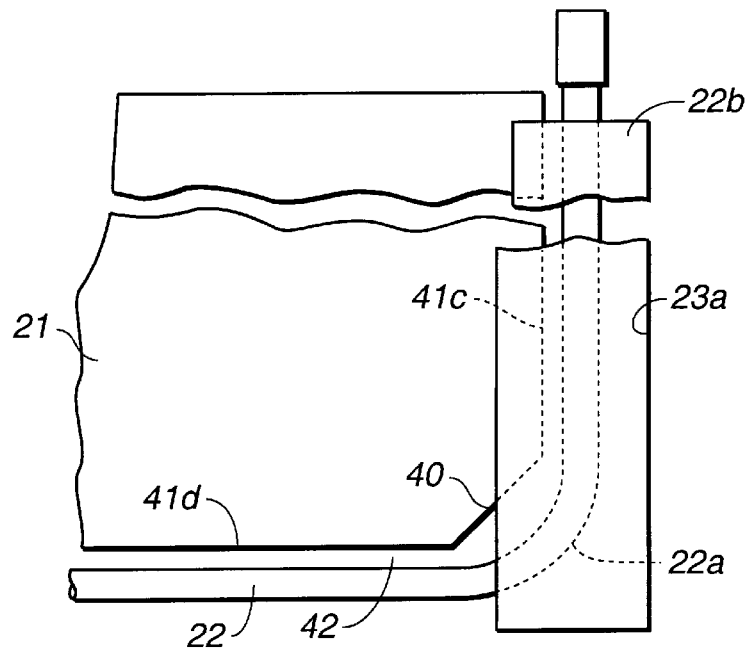
FIG._8A
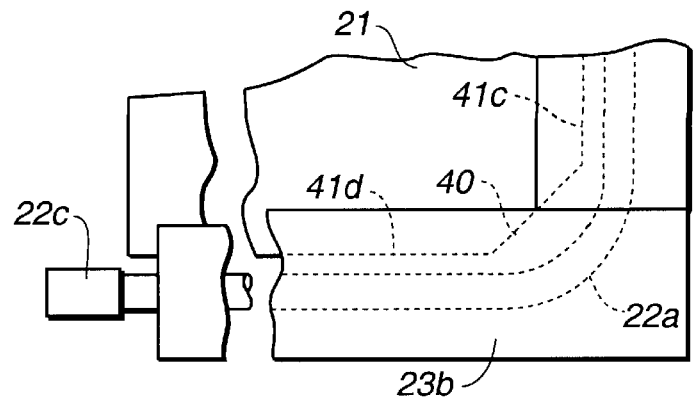
FIG._8B

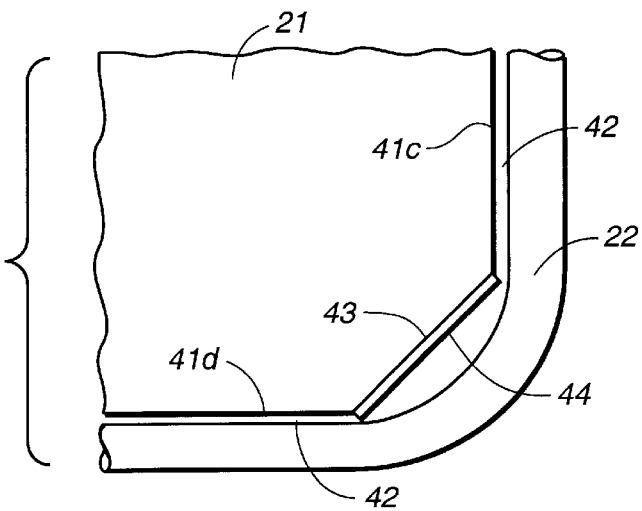
FIG._9
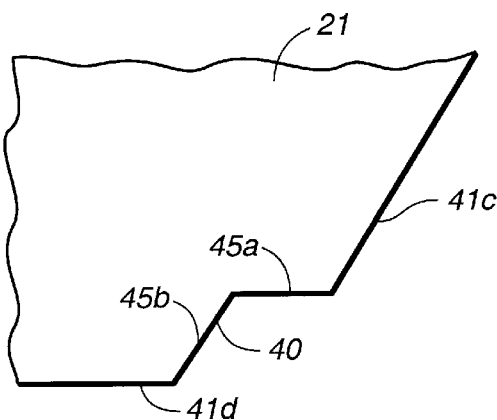
FIG._10A
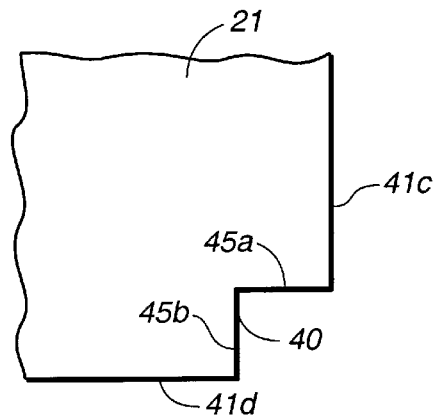
FIG._10B
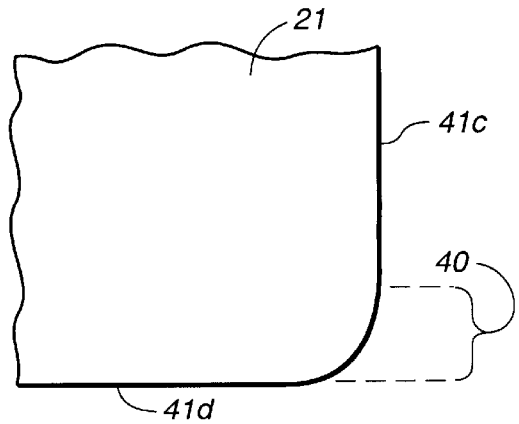
FIG._10C
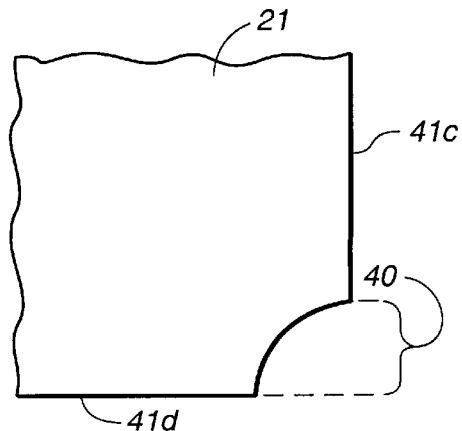
FIG._10D

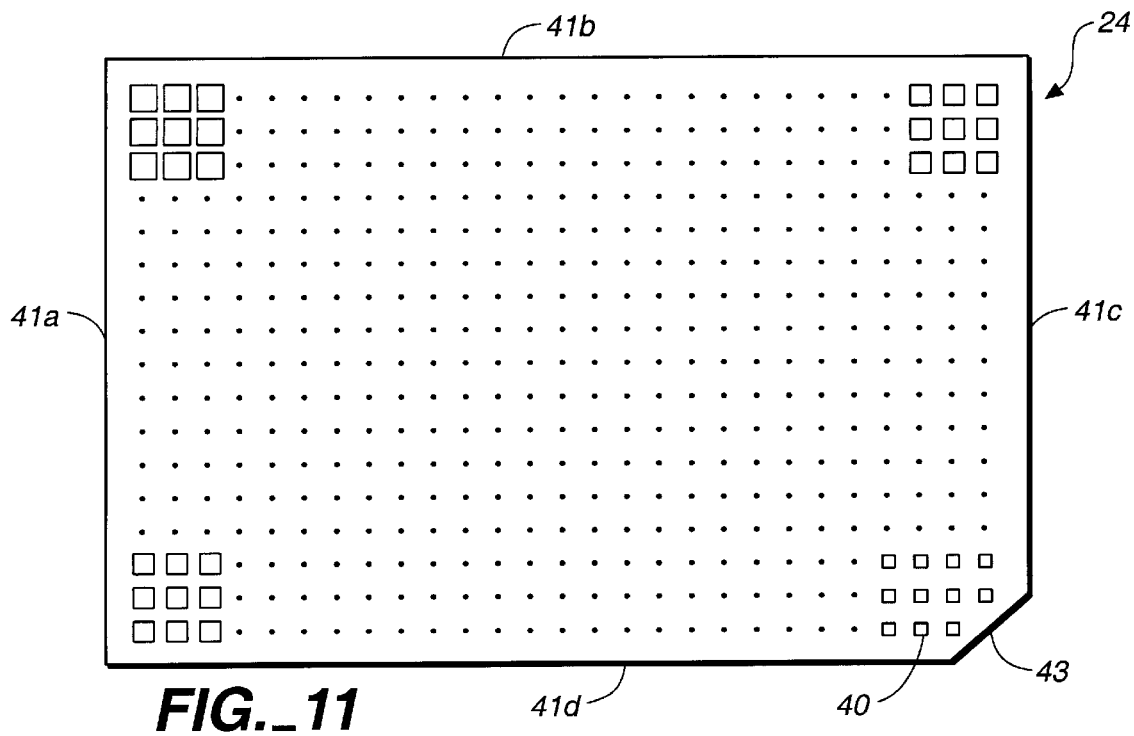
FIG._11
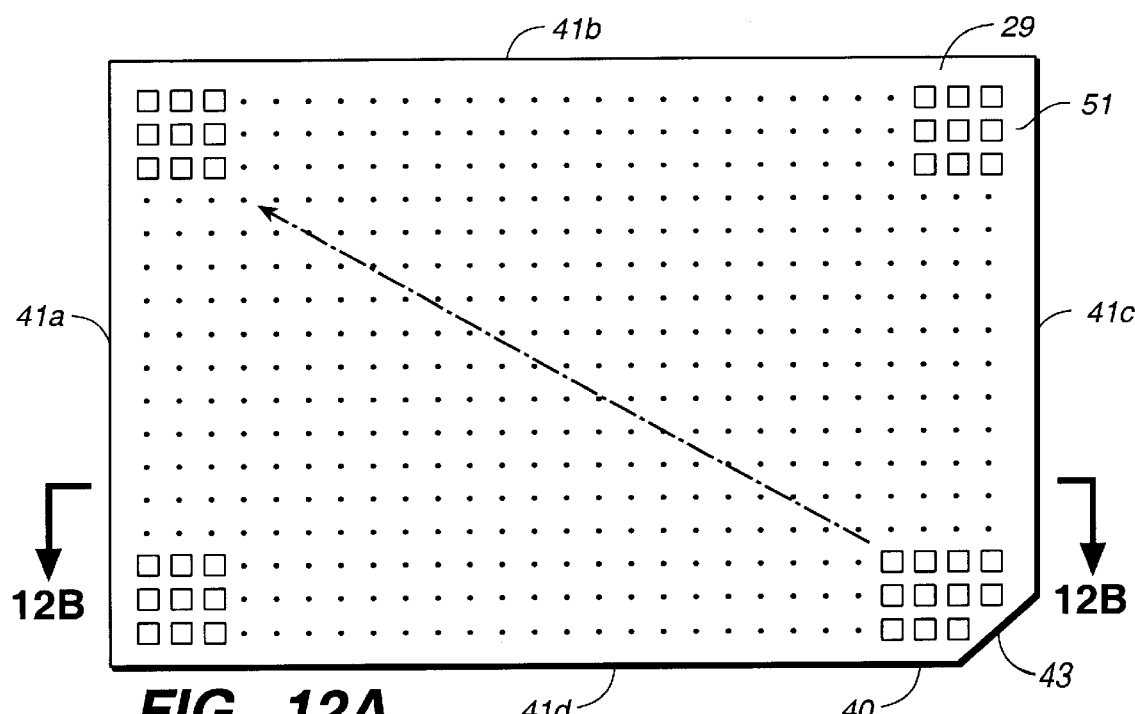
FIG._12A
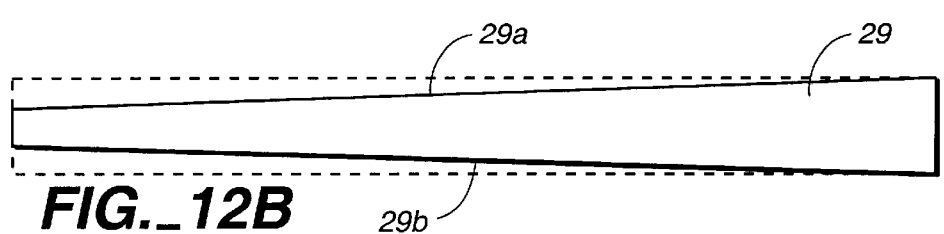
FIG._12B

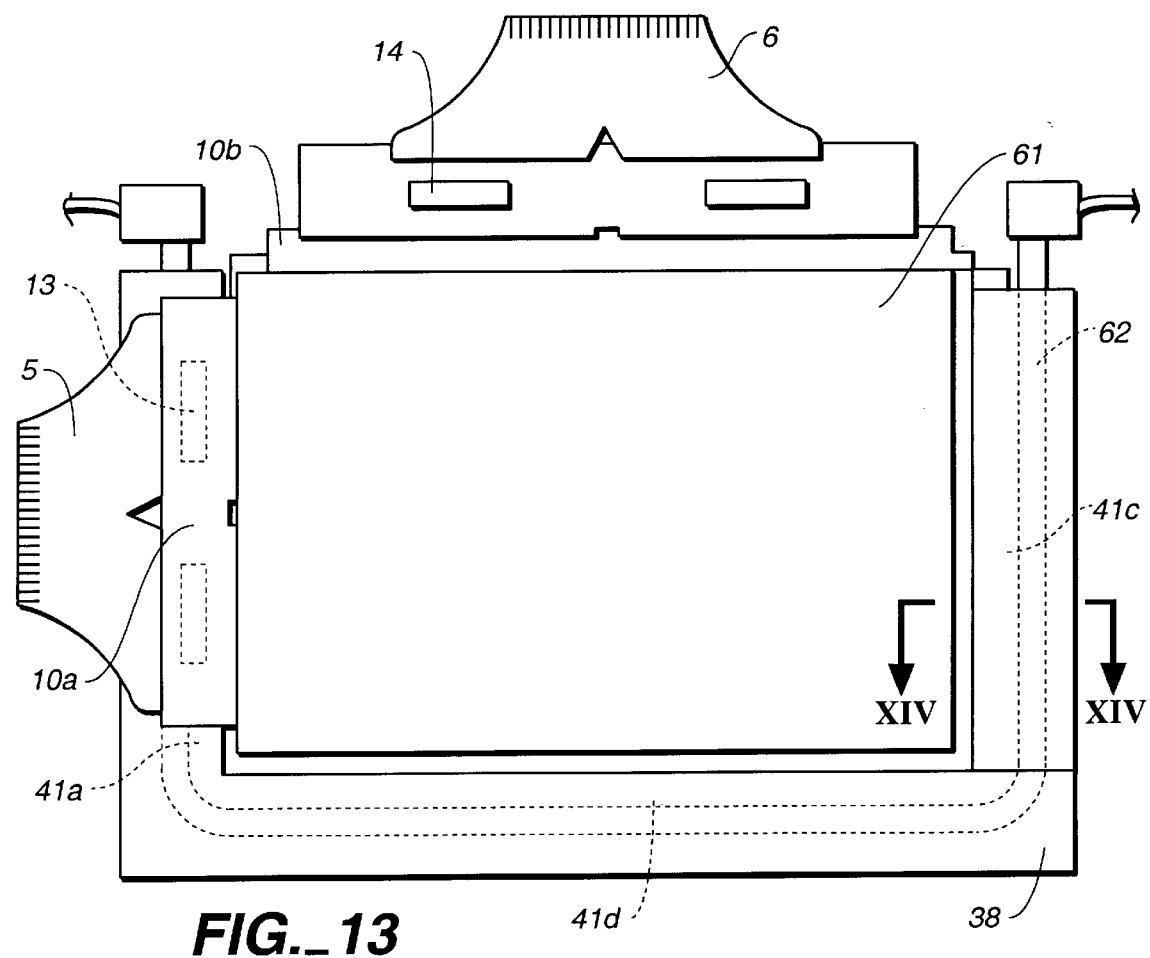
FIG._13
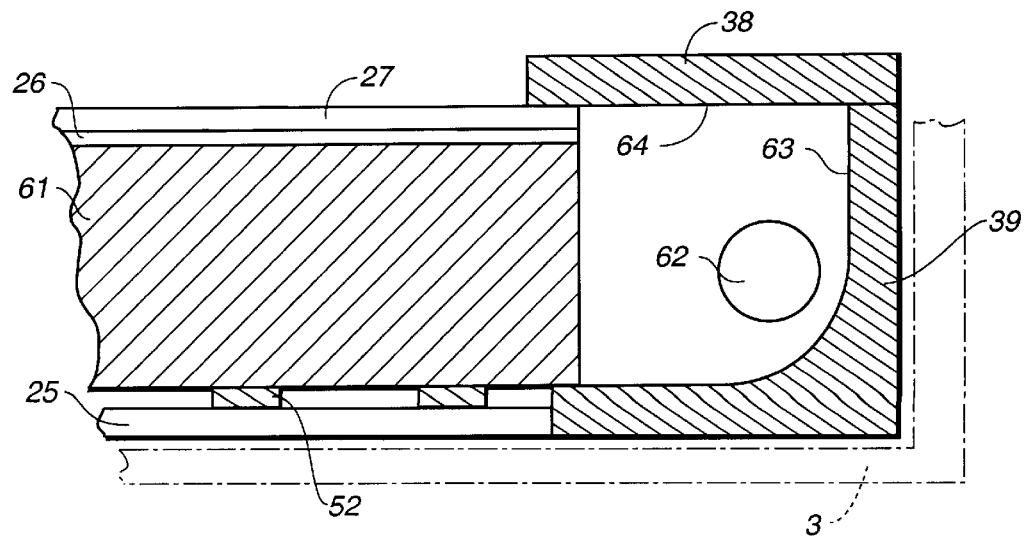
FIG._14

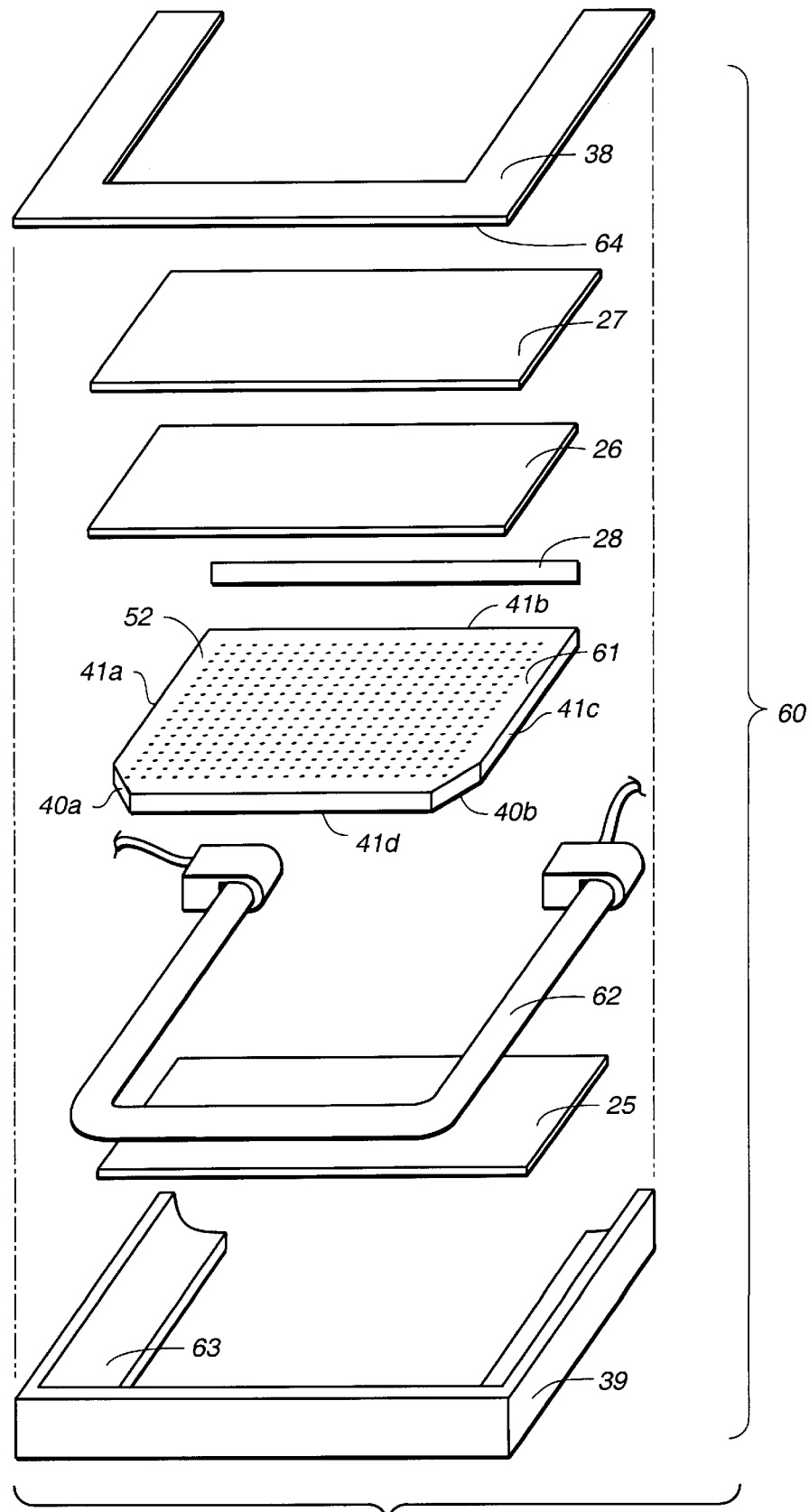
FIG._15

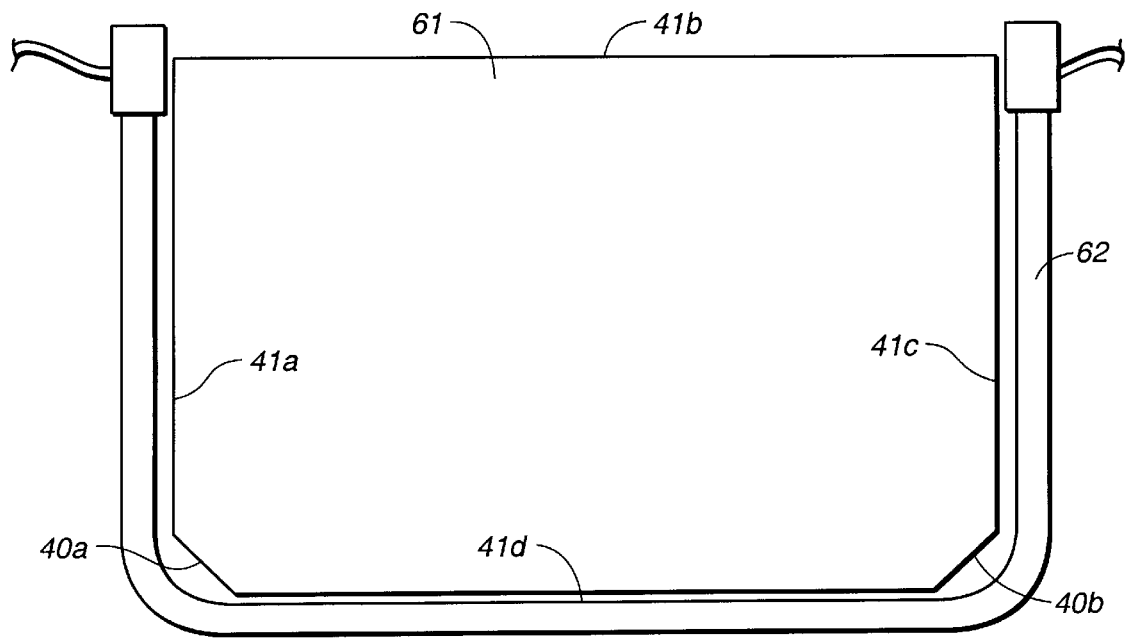
FIG._16
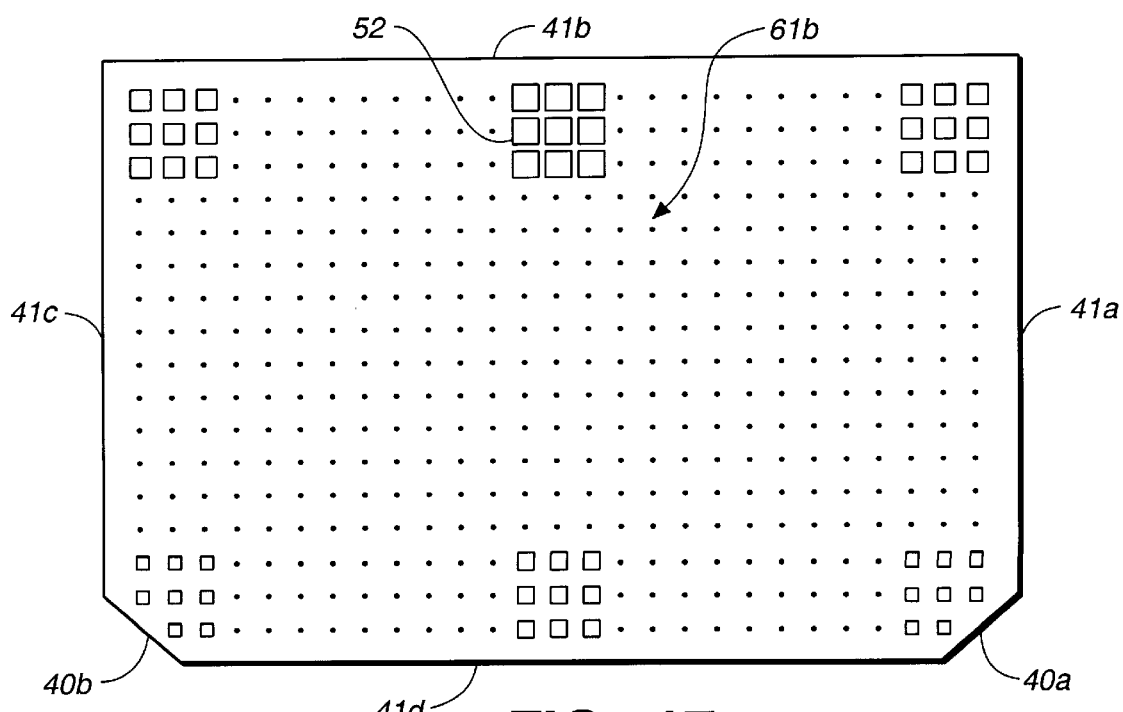
FIG._17

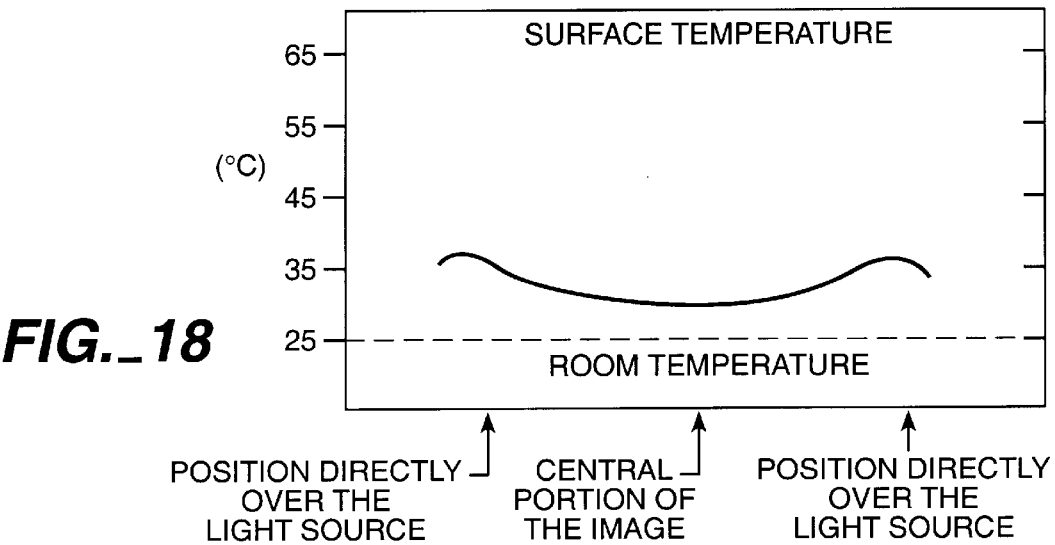
FIG._18
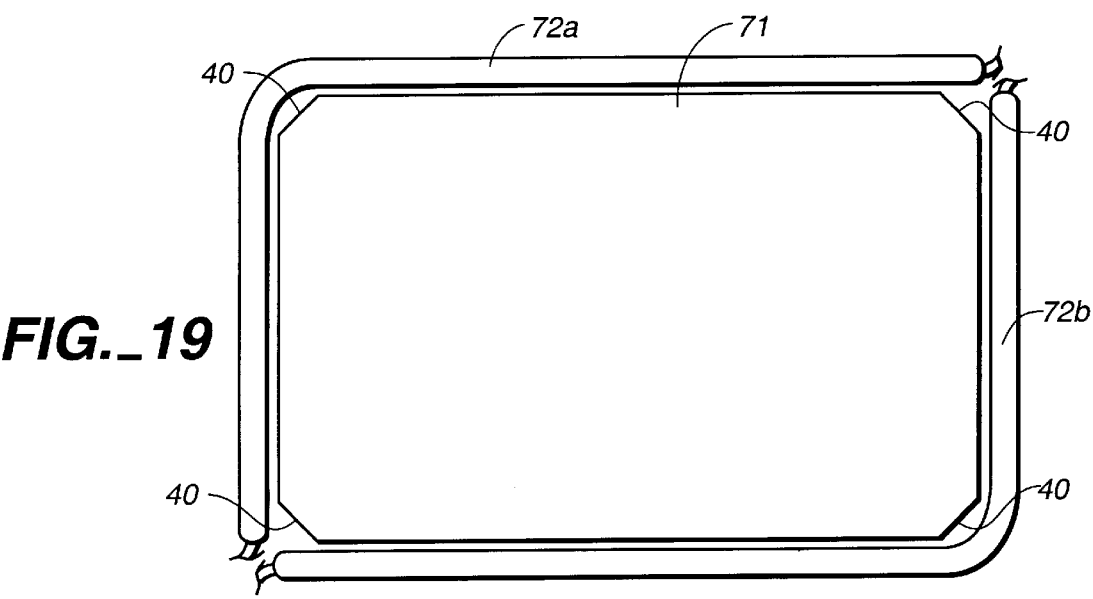
FIG._19
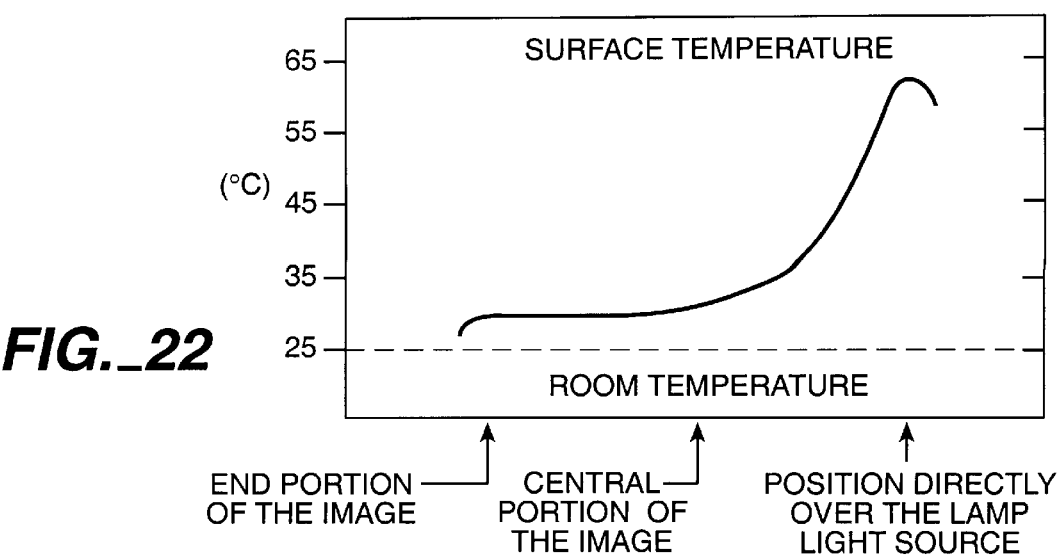
FIG._22

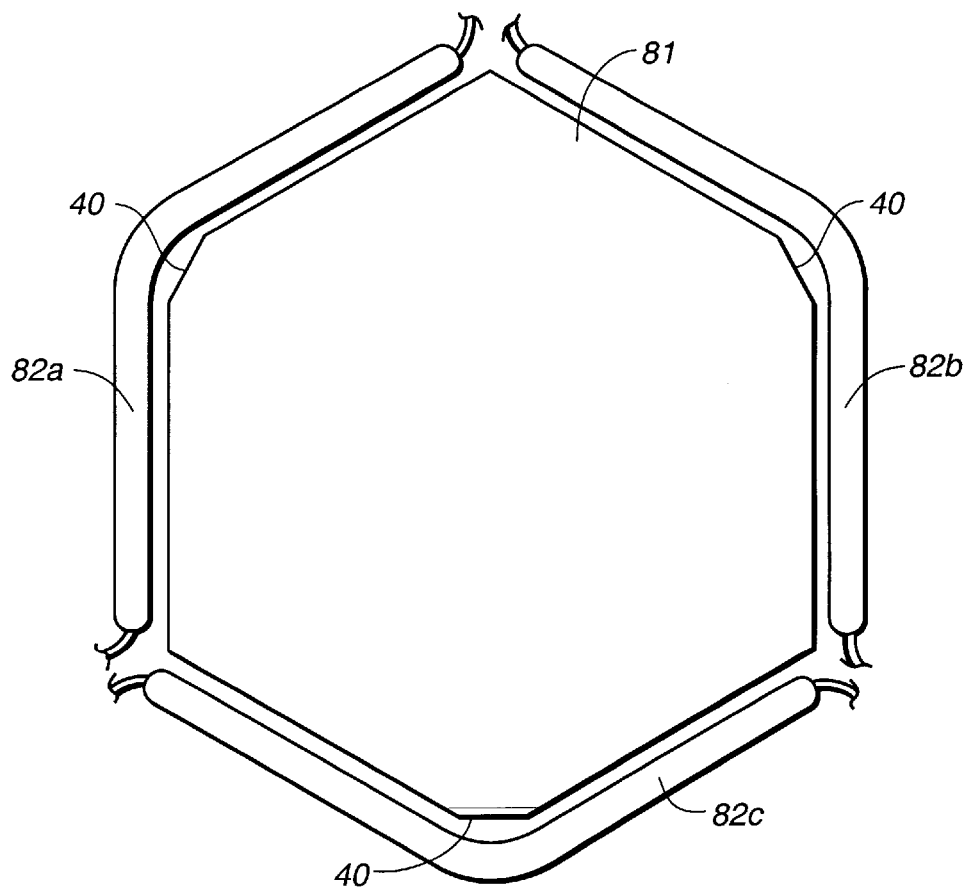
FIG._20
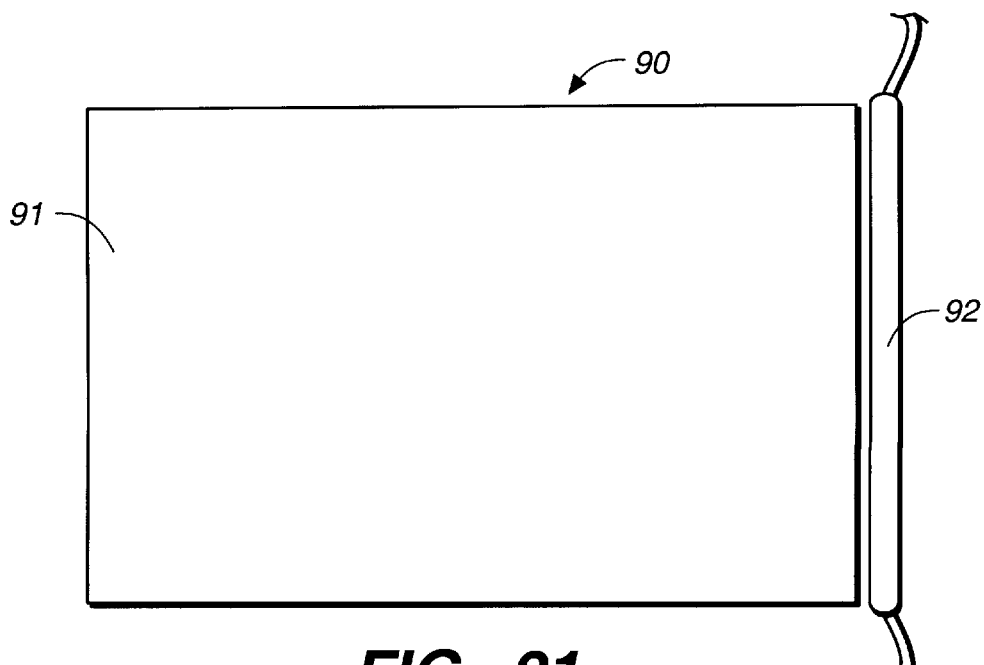
FIG._21

SURFACE-TYPE ILLUMINATION DEVICE AND LIQUID CRYSTAL DISPLAY

CROSS-REFERENCE TO RELATED APPLICATIONS

This is a Divisional of prior application Ser. No. 08/689,424 filed Aug. 9, 1996, now U.S. Pat. No. 5,949,505, which is a Division of application Ser. No. 08/204,374 filed May 10, 1994, now U.S. Pat. No. 5,619,351. Application Ser. Nos. 08/689,424 and 08/204,374 are incorporated herein by reference in their entirety.

BACKGROUND OF THE INVENTION

This invention relates in general to a thin, surface-type illumination device for providing backlight for liquid crystal displays (LCD) and, in particular, to a suitable illumination device for use in a notebook computer display that provides high brightness with low power consumption as well as to a liquid crystal display that uses this illumination device.

Surface-type illumination devices with a cylindrical light source and a flat light guide plate such as the devices described in Japanese Laid-Open Patent Application No. 60-205576 and Japanese Laid-Open Patent Application No. 61-248079 are well-known. One such example is shown in FIG. 21. In the illumination device 90, cylindrical fluorescent light 92 is positioned on one side of the substantially rectangular and flat light guide plate 91. The light introduced to light guide plate 91 from fluorescent light 92 is reflected by the diffusion pattern printed on light guide plate 91 and emitted from the surface of the light guide plate at a fixed density of light.

This type of surface illumination device, in recent years, has been used extensively to provide backlight for liquid crystal display panels. Liquid crystal display panels are increasingly used as displays in such devices as laptop computers, televisions and cameras. The use of liquid crystal display panels for color displays is also increasing. As the size of personal computers and televisions become smaller, it is imperative that liquid crystal display panels become thinner and lighter.

Accordingly, it is necessary that the surface-type illumination device used for liquid crystal display panels to provide backlight, along with the color displays, becomes thinner and lighter with less power consumption. Also, to use in color displays, a sufficient brightness is necessary to clearly show the colors displayed in the liquid crystal. This requires the use of a high output fluorescent light in the illumination device. However, along with the light, heat is also radiated from the high-output fluorescent light. The effect of this heat, as shown in FIG. 22, is significant. The temperature may rise 30–40° C. above a normal temperature of 25° C. Consequently, when this type of illumination device is used for providing backlight in an MIM active color display panel or in an STN passive color display panel, a special method to reduce the heat is necessary to control, to a certain extent, the color and brightness irregularities.

Instead of using one high output fluorescent tube, one may also increase the number of fluorescent tubes. In this way, it is possible to control to some extent the temperature increase due to the light source. However, as the number of fluorescent tubes is increased, many other problems appear. One of these problems is the variations in the illumination of the fluorescent tubes. Because the illumination intensity of florescent tubes varies according to each tube, it is necessary to adjust such things as the resistance within the fluorescent tube driver circuit to obtain a fixed illumination intensity. Consequently, in the case when several fluorescent tubes are used in one illumination device, extra time is required during the manufacturing process to obtain a balanced and fixed illumination intensity.

Another problem is the increased number of driver circuits required to turn on the fluorescent tubes. The number of these driver circuits can not be easily increased in devices such as microcomputers where thinness and small size are important.

SUMMARY OF THE INVENTION

In accordance with the instant invention, a suitable illumination device for color liquid crystal displays can be obtained that is small in size, lightweight, and has high and uniform brightness. Further, it is an object of the invention to provide a surface-type illumination device that can prevent heat generation and its resulting bad effects to the liquid crystal display panel.

Another object of the invention is to provide a surface-type illumination device that, without increasing the number of driver circuits for driving the fluorescent lights, displays a brightness higher than that in conventional illumination devices and restricts heat radiation.

A further object of the invention is to generate a suitable diffusion pattern to realize a surface-type illumination device, this diffusion pattern being used in the illumination device.

Still another object of the invention is to provide a stable liquid crystal display where the driver IC for driving the liquid crystal display panel is positioned so that it will not be affected by heat.

In accordance with the instant invention, by employing an illuminant longer than conventional illuminants, illumination with high illumination intensity is obtained without increasing the number of driver circuits for driving the illuminants and without concentrating the heat diffusion. Further, by bending the illuminant, light can be introduced along the polygon-shaped light guide plate. Also, to maintain proper space between the light guide plate and the illuminant and to increase the efficiency of the light introduced to the light guide plate, a corner is removed from an edge of the light guide plate. According to the invention, the surface-type illumination device comprises a light guide plate which is polygon-shaped and substantially transparent; a diffusion pattern arranged on one surface of the light guide plate for substantially evenly emitting light, the light being introduced from the illuminant to the other surface of the light guide plate; and a cylindrically-shaped illuminant bent so that the illuminant faces at least two sides of the light guide plate; wherein the edge between the two sides is processed so that the corner does not protrude.

By using an illuminant bent along the light guide plate, the length of the cylindrically-shaped illuminant is long, and an illuminant with large illuminating area can be used. Consequently, the rise in temperature of the illuminant can be kept down and high brightness can be obtained. Furthermore, the number of driver circuits for driving the illuminant can be decreased. When an illuminant such as a fluorescent light is bent to adjust for interference between the bent portion and the corner of the light guide plate, the width or length of the entire illumination device becomes longer, preventing miniaturization. In the instant invention, by removing a corner of the light guide plate, the distance between the light guide plate and the illuminant can be kept within a fixed range for high incident efficiency, and thus, a highly efficient illumination device that is small in size can be realized.

Further, by using a long illuminant as mentioned above, an improvement in the conversion efficiency from power to light is also attained. For example, in illuminants such as a fluorescent light, the power to the illuminant is consumed by the cathode drop, which is due to the glow discharge, and by positive column gradient voltage, which is due to light emission. When a plurality of illuminants are used and the input voltage increased, the portion consumed by the cathode drop voltage significantly increases and an increase in the positive column gradient tendency for light emission is small. However, in the illumination device of the instant invention, which uses a long illuminant, power is efficiently converted into light as the increase in the positive column gradient voltage is smaller than in the case when the number of illuminants is increased.

The edge of the light guide plate can be processed into many different shapes, for example, the corner in the shape of an isosceles triangle can be removed. In the case of the isosceles triangle, a high incident efficiency of light from the illuminant to the light guide plate can be maintained. It is desirable to make the length of one of the sides of the isosceles triangle in the approximate range of 0.6 times to 1.0 times the smallest radius of curvature of the bent portion of the illuminant so as to realize a small-sized illumination device. Also, in order to prevent light incident from the edge, and to increase the uniformity of the light radiated from the light guide plate, it is effective to include a shield at the edge portion to prevent introduction of light from the illuminant.

Also, the corner of the edge in a diamond-shape may be removed. In order to make the incident efficiency high and keep the size of the device small, it is desirable to make the length of one of the sides of the removed corner in a diamond-shape within a range of 0.6 times to 1.0 times the smallest radius of curvature of the bent portion of the illuminant. Also, if all the corners are removed from the edges of the light guide plate so that they do no protrude, the directionality of the light guide plate disappears and the manufacturing process time for positioning the light guide plate is saved.

It is common to cover the illuminant with a reflector to increase the incident efficiency of the light from the illuminant to the light guide plate. When a bent illuminant such as the one described above is used, it is desirable for the reflector to include a straight first reflector and a second reflector positioned along two sides of the light guide plate such that at the edge the first reflector is covered by the second reflector. It is also possible for the reflector to include a first reflector that covers the lower half portion of the illuminant on one side of the light guide plate and a second reflector that covers the upper half of the illuminant from the other side of the light guide plate.

The diffusion pattern that diffuses light incident to the light guide plate from the bent illuminant can be generated by the following method. To generate a diffusion pattern that evenly radiates, from the other side of the light guide plate, light introduced from the illuminant to the light guide plate in an illumination device where a cylindrically-shaped illuminant is positioned near at least a first side and a second side of a substantially rectangular light guide plate, the density distribution per unit area of the diffusion pattern can be found by the following method: finding a predicted emitted light intensity distribution for the y-direction along the first side based on the intensity of the light incident to the light guide plate from the second side and the density distribution of a presupposed diffusion pattern; then finding a predicted emitted light intensity distribution for the x-direction along the second side based on the intensity of the light incident to the light guide plate from the first side and the density distribution of the presupposed diffusion pattern; and then compensating the density distribution of the presupposed diffusion pattern so that the sum of the predicted emitted light intensity distribution for the x-direction and the predicted emitted light intensity distribution for the y-direction on arbitrary rectangular xy coordinates of the light guide plate fit within a fixed range.

When an edge reflector is installed at at least one of the two sides opposite to the first side and the second side, respectively, for reflecting the light from the inner part of the light guide plate to the light guide plate, it is desirable to compensate the density distribution by computing the reflected light intensity incident from the edge reflector to the light guide plate with a fixed attenuation factor; finding a predicted emitted light intensity distribution for at least one of the x and y directions of the reflected light intensity; and adding this to the predicted emitted light intensity distribution found above.

By printing the diffusion pattern described above on the light guide plate or by putting on the light guide plate a sheet with the pattern formed on it, light introduced from the bent illuminant can be evenly radiated from the light guide plate. Similarly, light can be evenly emitted by making the thickness of a light guide plate with an even diffusion pattern inversely proportion to the compensated density distribution of the diffusion pattern.

Effects of the heat from the illuminant can be minimized by using as a bent illuminant an L-shaped illuminant and by placing in a position opposite to the illuminant a driver device such as a driver IC for driving the liquid crystal display. Consequently, as the threshold value of the driver does not become unstable due to the heat, a color display with stable contrast is obtained. Further, a high quality display with high brightness and a small illumination device are also obtained.

Further, a stable, high quality display can be obtained that reduces heat using an even longer U-shaped illuminant. The brightness of the display is easy to adjust when illuminants such as L-shaped and U-shaped illuminants are used because nearly the same intensity of light is incident from the periphery of the light guide plate. Of course, an O-shaped illuminant can also be arranged around the periphery of a rectangular light guide plate as well as an illuminant bent to fit the shape of any other polygon.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a sketch of a liquid crystal display using the surface-type illumination device in accordance with the first embodiment of the invention.

FIG. 2 is a cross-sectional view of FIG. 1 showing the structure of the liquid crystal display.

FIG. 3 is a break-down view showing the structure of the liquid crystal display shown in FIG. 1.

FIG. 4 is a break-down view showing the construction of the surface-type illumination device used in the liquid crystal display shown in FIG. 1.

FIG. 5 is a top plan view illustrating the combination of the surface-type illumination device shown in FIG. 4 and the liquid crystal display panel.

FIG. 6 is an explanatory drawing showing the positioning of the light guide plate and fluorescent light of the surface-type illumination device of FIG. 4.

FIG. 7 is a cross-sectional view taken along the line VII—VII in FIG. 5 showing the relationship of the light guide plate, fluorescent light, and reflector of the surface-type illumination device of FIG. 4.

FIGS. 8A and 8B illustrate the assembly of the reflector of FIG. 7.

FIG. 9 is an enlarged view of the edge of the light guide plate.

FIGS. 10A–10D show enlarged views of several possible edge formations of the light guide plate.

FIG. 11 is an explanatory drawing showing the diffusion pattern formed on the diffusion sheet which sticks to the light guide plate.

FIG. 12A is a plan view showing a light guide plate whose thickness has been changed.

FIG. 12B is a cross-sectional view showing a light guide plate whose thickness has been changed.

FIG. 13 is a top plan view showing the combination of the liquid crystal display panel and illumination device in accordance with the second embodiment of this invention.

FIG. 14 is a cross-sectional view showing the relationship of the liquid crystal display panel, illumination device, and illuminant as shown in FIG. 13.

FIG. 15 is a break-down view showing the construction of the structure of the surface-type illumination device used in the liquid crystal display shown in FIG. 14.

FIG. 16 is an explanatory drawing showing the relationship of the light guide plate and the fluorescent light which is in the surface-type illumination device of FIG. 15.

FIG. 17 is an explanatory drawing showing the diffusion pattern that is printed on the light guide plate of FIG. 15.

FIG. 18 is a graph showing the surface temperature of the liquid crystal display panel shown in FIG. 13.

FIG. 19 is an explanatory drawing showing another relationship of the light guide plate and the fluorescent light.

FIG. 20 is an explanatory drawing showing still another relationship of the light guide plate and the fluorescent light.

FIG. 21 is an explanatory drawing showing a conventional light guide plate and fluorescent light.

FIG. 22 is a graph showing the surface temperature of a liquid crystal display panel using a surface-type illumination device similar to the one shown in FIG. 21.

DESCRIPTION OF THE PREFERRED EMBODIMENTS

EMBODIMENT 1

FIG. 1 is a sketch of liquid crystal display 1 in accordance with one embodiment of this invention. Liquid crystal display 1 is constructed with liquid crystal display panel 10 and an illumination device to be described later sandwiched between upper case 2 and lower case 3. Upper case 2 and lower case 3 are fixed in place by tooth 4. The scanning data that comprises the image is supplied from the host side to each row or column through tape electrode 5 and tape electrode 6. This data is latched by a driver IC which will be described below, is synchronized, and is supplied to liquid crystal display panel 10 where the image is formed. Power is supplied from the driver circuit of the host side to the fluorescent light comprising the illumination device through connector 7, connector 7 extending past liquid crystal display 1 and used for initiating lighting.

The basic structure of one embodiment of liquid crystal display 1 will be explained using the cross-sectional view of liquid crystal display 1 shown in FIG. 2 and the break-down view of liquid crystal display 1 shown in FIG. 3. In liquid crystal display 1, illumination device 20 is installed in lower case 3. Above device 20, liquid crystal display panel 10 is installed using frames 30 and 31. Liquid crystal display panel 10 is formed by enclosing the liquid crystal, transparent electrodes, etc. between two layers of transparent glass substrates 11 and 12. At side 10a of liquid crystal display panel 10, a plurality of driver ICs 13 are installed for latching pixel data for the rows and sending it to the liquid crystal display panel. Also, at side 10b, which is adjacent to side 10a, a plurality of driver ICs 14 are installed for latching pixel data for the columns and sending it to the liquid crystal display panel.

Frames 30 and 31 are used to protect illumination device 20 and to position it within the case. At the same time, it also fills the role of maintaining a fixed distance for gap 33 between illumination device 20 and liquid crystal display panel 10, for example, 0.2–1 mm. For this reason, frames 30 and 31 are prepared so that their lower halves 34 and 35 support illumination device 20 and their upper halves 36 and 37 act as spacers between illumination device 20 and liquid crystal display panel 10. In this example the frame is divided into two pieces, however, the number of pieces is not limited to two. For example, three pieces, four pieces, or even more is possible, and even just one piece is also possible. Furthermore, the frame need not cover the entire periphery of illumination device 20 or liquid crystal display panel 10. A plurality of pieces may be arranged in appropriate places.

Illumination device 20 is a surface-type illumination device set up with a cylindrically-shaped fluorescent light 22 at the edge of substantially rectangular light guide plate 21. Fluorescent light 22 is roughly L-shaped and is covered by reflectors 23a and 23b. Wires for supplying power to drive fluorescent light 22 extend from both ends of fluorescent light 22 and are connected to the driver circuit on the host side through connector 7 which is for turning on the light. FIG. 4 is a break-down view of illumination device 20 and will be used to explain the structure of the illumination device of this embodiment. Illumination device 20 is comprised of light guide plate 21, which is substantially rectangular in shape and has the corner of at edge 40 missing, fluorescent light 22, which encompasses edge 40 in an L-shape, and reflectors 23a and 23b, which cover fluorescent light 22 in the direction of light guide plate 21 and efficiently reflect light from fluorescent light 22 to light guide plate 21. On lower surface 21b of light guide plate 21, i.e., the side opposite to the side where liquid crystal display panel 10 is arranged, pattern sheet 24, which is printed with diffusion pattern 50, and reflecting sheet 25 are arranged in that order. On upper surface 21a of light guide plate 21, i.e., the side where liquid crystal display panel 10 is arranged, diffusion sheet 26 and prism sheet 27 are arranged. Edge reflective tape 28 is put on edge 41a and 41b, opposite to fluorescent light 22 of light guide plate 21.

Light guide plate 21 is a transparent material whose index of refraction is greater than that of air. An index of refraction equal to or greater than 1.41 is desirable using such materials as acrylic resin, polycarbonate resin, amorphous polyolefine-type resin, and polystyrene resin. Use of these types of materials for light guide plate 21 results in a critical angle of 45° or less. If upper surface 21a and lower surface 21b are smooth and mirror-like, the light incident from edges 41a, 41b, 41c, and 41d, which are formed at right angles to surface 21a and 21b, is completely reflected from surfaces 21a and 21b.

Pattern sheet 24 is a transparent sheet with a fixed number of diffusion patterns 50 printed on it, the printed diffusion patterns being adhered to lower surface 21b of light guide plate 21. Light incident from sides 41, to some extent, reaches diffusion pattern 50 and, without being completely reflected, will be diffused in the direction of upper surface 21a. Consequently, light incident from the fluorescent light by way of the edges is emitted to liquid crystal display panel 10 from upper surface 21a.

Reflecting sheet 25 is a thin PET sheet with a thickness of approximately 0.05–0.5 mm. Light coming from upper surface 21a of light guide plate 21 through diffusion pattern 50 travels through diffusion sheet 26 and prism sheet 27, which are arranged on the upper portion of upper surface 21a and light up liquid crystal display panel 10. However, a portion of the light is reflected from sheets 26 and 27 in the lower direction. The light reflected from the upper direction is returned to light guide plate 21, among others, through reflecting sheet 25 among others. Reflecting sheet 25 may be aluminum or other non-PET material. Also, lower case 3 may be used as a reflector in place of a reflecting sheet. Further, the frame of a computer or similar part carrying the illumination device or liquid crystal display can also be used as a reflector in place of the reflecting sheet.

Diffusion sheet 26 is an approximately 0.05–0.5 mm thin PET sheet or PC sheet. Diffusion sheet 26 diffuses the light that is reflected by diffusion pattern 50 and radiated from upper surface 21a. Diffusion pattern 50 is often formed in a narrow line configuration or net configuration. The light that is reflected by these types of patterns is diffused by diffusion sheet 26. The diffusion pattern cannot be recognized from liquid crystal display panel 10. Diffusion sheet 26 is arranged with a very small layer of air between it and upper surface 21a of light guide plate 21. The angle mentioned above is maintained in regards to the angle of upper surface 21a. Reflection sheet 26 is not limited to a PET sheet and such sheets as acrylic-type sheets, among others, may be used.

Prism sheet 27, which is arranged on diffusion sheet 26, is made up of very small linear prisms lined in a cross-sectional array. The angle of the light radiating from diffusion sheet 26 is arranged to improve the illuminating intensity of liquid crystal display panel 10. Although the brightness can be improved through prism sheet 27, when sufficient brightness is achieved through diffusion sheet 26, prism sheet 27 can be omitted, thus reducing manufacturing cost.

Fluorescent light 22, which is used as the light source of illumination device 20, is in an L-shape, and is positioned adjacent to edges 41c and 41d of light guide plate 21. It is desirable, as will be explained later, to maintain a gap between edges 41c and 41d and fluorescent light 22 of around 0.8–1.5 mm. The corner of edge 40 of light guide plate 21 is removed and fluorescent light 22 is able to be positioned with the above noted gap. Also, by removing this corner, fluorescent light 22 and the corner of light guide plate 21 are prevented from touching and damage to the fluorescent light can be prevented.

Fluorescent light 22 is covered by reflectors 23a and 23b to make the light discharged from fluorescent light 22 incident with good efficiency from edge 40 of light guide plate 21. Reflectors 23a and 23b are PET sheets deposited with silver and of a thickness of approximately 0.01–0.1 mm. In order to provide low cost reflectors that cover the L-shaped fluorescent light and that are easy to install, two straight reflectors are used. This will be explained in greater detail below.

Edge reflective tape 28 is arranged at two edges 41a and 41b, which are opposite to edges 41c and 41d, respectively, where fluorescent light 22 and reflector 23 are installed. Edge reflective tape 28 is a PET sheet deposited with silver with thickness of approximately 0.01–0.1 mm. The light introduced to light guide plate 21 from fluorescent light 22 is completely reflected away. The light that reaches the edges of the opposite side is returned to light guide plate 21. Materials such as white PET sheets and aluminum can be used for the edge reflective tape as well as the reflectors mentioned above. It is also possible to integrate these into a case or frame.

FIG. 5 shows liquid crystal display panel 10 installed on illumination device 20. Driver ICs 13 and 14 are arranged on sides 10a and 10b, respectively, adjacent to liquid crystal display panel 10. Opposite to sides 10a and 10b, L-shaped fluorescent light 22 extends along two sides 20c and 20d of illumination device 20. Because of this arrangement, driver ICs 13 and 14 are not directly influenced by the heat from fluorescent light 22. Consequently, the temperature of the driver ICs does not rise significantly, preventing changes in the driver's threshold value. For this reason, an image with very low fluctuations in contrast can be obtained using liquid crystal display panel 10.

By using a light like the L-shaped fluorescent light 22 shown in FIG. 6, the temperature distribution of the entire liquid crystal display panel 10 becomes flat. In order to illuminate liquid crystal display panel 10 for color displays, high brightness is essential. Because of this, as explained earlier in connection with FIG. 22, the output of conventional fluorescent lights that are installed at one edge is increased and the slope of the temperature distribution of the liquid crystal display panel becomes large. This results in color and brightness irregularities and poor display quality. However, by introducing light from two edges, as in the instant invention, a rise in the temperature of the liquid crystal display panel can be suppressed and high brightness can be obtained.

When introducing light from two edges, it is possible to use two fluorescent lights. This makes it possible to limit the increase in the temperature of the liquid crystal display panel as compared to the method of introducing light from only one edge. However, as two driver circuits would be necessary to drive the two fluorescent lights, it would not be desirable to incorporate them into small personal computers and televisions. In the instant invention, temperature rise can be suppressed and a high brightness can be obtained without increasing the number of driver circuits.

Also, because the light conversion efficiency can be increased by using an L-shaped fluorescent light, temperature rise can be further limited. The majority of the power input into the fluorescent light is consumed as a cathode drop voltage which generates glow discharge. For example, when two fluorescent lights are used, two times the power is required, with most of it being consumed in order to generate two glow discharges. However, when a long fluorescent light is used, such as in the instant invention, the cathode drop voltage consumed by glow discharge does not increase that much. Because of this, when two times the power is supplied, most of the increased power is consumed as a positive column gradient voltage in generating light. Consequently, the same brightness can be obtained with lower voltage and lower temperature rise. For this reason, the rise of the temperature of the liquid crystal display panel can be held down and a good quality image can be obtained. Also, because the power consumption can be kept down, it is a suitable illumination device for illumination in liquid crystal display panels in small, portable devices where batteries are used as the power source.

There are many merits in the illumination device of the instant invention which uses L-shaped fluorescent light 22. However, it is not as easy as just installing L-shaped fluorescent light 22 at edge 40 of light guide plate 21. This is because corner 43 of rectangular-shaped light guide plate 21 (when the corner has not been removed) and bent portion 22*a* of fluorescent light 22 interfere with each other and therefore, gap 42 between edge 41 and fluorescent light 22 becomes exceedingly large. When gap 42 cannot be reduced, the entire illumination device 20 becomes larger and the scale of the liquid crystal display cannot be reduced. Also, when the gap between edge 41 and fluorescent light 22 becomes larger, the light introduced to edge 41 decreases. Reflector 23 can, to some extent, prevent the decrease of the light from fluorescent light 22, but a large reflector is required. However, in light guide plate 21 of the instant invention, at edge 40, corner 43 which interferes with fluorescent light 22, is removed so that the corner does not stick out and gap 42 is reduced. By removing the corner at edge 40, damage to fluorescent light 22 due to corner 43 impacting fluorescent light 22 during shipping can be prevented. Also, damage to fluorescent light 22 caused by thermal expansion of light guide plate 21, vibration, etc. can be prevented.

Gap 42 between edge 41 and fluorescent light 22 is not completely eliminated. Not only do problems with precision during product manufacturing exist, but if gap 42 is reduced too much, the light reflected to reflector 23 is absorbed by fluorescent light 22 and the introduction efficiency to surface 41 is reduced. In FIG. 7, the light radiated from fluorescent light 22 to the opposite side at edge 40 is reflected by reflector 23 and introduced to edge 40. Consequently, if gap 42 is too small, the reflected light is introduced to fluorescent light 22 and completely absorbed within fluorescent light 22 and, thus, the amount of light introduced to edge 40 is reduced. If gap 42 is large, the incident efficiency improves, but when the width of gap 42 exceeds a prescribed value, the increase in the incident efficiency becomes less to the extent that limiting the size of illumination device 20 becomes more desirable. An appropriate gap 42 is judged by this inventor to be approximately 0.8–1.5 mm. More specifically, in the case of fluorescent light 22 with a diameter of 2.5–4 mm, a gap of around 1–1.5 mm is desirable.

The light reflected from reflector 23 is an important light source for illumination device 20. Although there are several different ways of setting up a reflector with respect to bent fluorescent light 22 of the instant invention, one method, as shown in FIG. 8, is to use two reflectors 23*a* and 23*b* which are made from flat material and bent in a nearly half circular shape. Reflector 23*a* corresponds to the short side of light guide plate 21 and is long enough to cover from bent portion 22*a* to electrode 22*b* of the short side of bent fluorescent light 22. Likewise, reflector 23*b* corresponds to the long side of light guide plate 21 and is long enough to cover from bent portion 22*a* to electrode 22*c* on the long side of bent fluorescent light 22. At the time of manufacturing illumination device 20, one of the reflectors, for example, the shorter reflector 23*a* is first arranged. If the other reflector, for example, longer reflector 23*b*, is laid from the top of the first reflector to the other side fluorescent light 22 can be completely covered. In this way, two separate reflectors 23*a* and 23*b* can be used to easily cover bent fluorescent light 22 and assembly of the reflectors is made easy. Also, in conforming to the bent-shape of fluorescent light 22, reflectors 23*a* and 23*b* do not have a complex shape, but rather, a simple straight-line shape is used and therefore manufacturing cost can be kept down.

The aperture ratio is vital to increasing the incident efficiency from fluorescent light 22 to edge 40. A desirable range for this aperture ratio, which is defined as (thickness of light guide plate 21)/(diameter of fluorescent light 22), is around 0.9–2. If the aperture ratio is higher, the incident efficiency does not improve much.

The removal of different shapes of the corner at edge 40 is possible. In this embodiment of the invention, a corner in the shape of an isosceles triangle is removed from edge 40. Edge 43, which makes an angle of approximately 45° with respect to both edges 41*c* and 41*d*, is formed by edge 40. Because the light directly incident to edges 41*c* and 41*d* from fluorescent light 22 is reflected at edge 40, the influence of this portion to the intensity of the light radiated from upper surface 21*a* of light guide plate 21 is small. The influence of this removed shape to the uniformity of the brightness is also small. However, with the scattered light that differs in the incident angle, there is a possibility that the brightness uniformity incident from edge 43 and radiated from upper surface 21 will be hindered. In the instant invention, reflecting member 44 is mounted to prevent light incident to light guide plate 21 from edge 43. A plastic sheet deposited with white, silver, or aluminum among others or even a molded part can be used as reflecting member 44. This reflects light rays and prevents them from leaving light guide plate 21 and passing through edge 43, and at its opposite side, it shields light rays coming from fluorescent light 22, maintaining brightness uniformity. As edge 40 becomes larger, the light introduced from light guide plate 21 is reduced in the vicinity of the edge. Consequently, in order to maintain uniformity of brightness, it is desirable to establish limitations for the size of the triangle shape that will be removed. On one hand, if too little is removed, gap 42 between fluorescent light 22 and edge 41 cannot be properly maintained. In considering this, it is found desirable to make the length of the two substantially equal sides of the triangle to be within the range of 0.6 to 1.0 times the smallest radius of curvature of bent portion 22*a* of fluorescent light 22.

FIG. 10 shows other shape variations that are used in other embodiments of the invention. FIGS. 10A and 10B are examples of the corner removed from edge 40 which is parallel to adjacent sides 41*c* and 41*d*. In order to make this type of shape, edge 40 should be cut in a diamond shape, or in a square shape if the light guide plate is rectangular. Edges 45*a* and 45*b*, which are obtained after cutting a diamond-shaped corner, are approximately parallel to adjacent edges 41*c* and 41*d* of light guide plate 21. Consequently, the light introduced to light guide plate 21 from these edges 45*a* and 45*b* have substantially the same vector as edges 41*c* and 41*d*, and the probability of light being incident from the edges or being emitted from the edges is substantially the same. Therefore, it is rare for edge 40 to exert an influence on the uniformity of the brightness of the light radiated from the illumination device. For this reason, even if reflecting member 44 is omitted, it is still possible to obtain uniform brightness. However, it is difficult to maintain good uniformity if the gap between the edge and the fluorescent light becomes large. In considering the fluorescent light and interference, it is found to be desirable to make the length of one of the diamond-shaped sides, as noted above, to be within the range of 0.6 to 1.0 times the smallest radius of curvature of bent portion 22*a* of fluorescent light 22.

FIGS. 10C and 10D show other examples of the shape of edge 40 when the manufacturing process of light guide plate 21 is considered. In the case of injection formation of light guide plate 21 and from the aspect of type processing, a "fan-shape" as shown in FIG. 10C can be used. In the case of machining light guide plate 21 to form edge 40, an "opposite fan-shape" is possible. Of course, other shapes are also possible.

FIG. 11 shows diffusion pattern 50 for emitting light introduced to light guide plate 21 from bent fluorescent light 22 to the liquid crystal display panel through upper surface 21a of light guide plate 21. Although in this embodiment diffusion pattern 50 is printed on pattern sheet 42, it is also possible to print the pattern directly on lower surface 21b of light guide plate 21. It also is, of course, possible to draw diffusion pattern 50 on the lower surface of light guide plate 21 by using such methods as etching. Although line patterns and dot patterns are most commonly used, other patterns, as well as increasing or decreasing the pattern area density at different places are also possible.

In the case of the dot diffusion pattern, a method of increasing or decreasing the area of each dot or a method of increasing or decreasing the dot density is possible for adjusting the area density of the pattern. FIG. 11 shows an example of a pattern where the area of the dots are increased or decreased. The dot areas are small near edges 41c and 41d where fluorescent light 22 is positioned and these areas gradually increase as they move towards the opposing edges 41a and 41b. The dots near edge 40 which is near bent portion 22a of fluorescent light 22 have the smallest areas and the dots on the corner opposite to this between edge 41a and 41b have the largest areas.

The density distribution S(x,y) of this diffusion pattern is described below. Here, x and y are coordinates along edges 41c and 41d of fluorescent light 22, and a coordinate axis is used that increases in the direction away from fluorescent light 22. For some small areas, the density distribution of a diffusion pattern is assumed in advance to be $Sx_iy_j$. The intensity $l_{1,1}$ of the light diffused by the diffusion pattern of density distribution $Sx_1y_1$ as it relates to the light incident from the x direction with an intensity of Lx is represented by the following equation, where k is a reflection coefficient.

$$l_{1,1} = Lx \times Sx_1y_1 \times k \qquad (1)$$

The intensity of the light diffused at the next small area in the x direction, $l_{2,1}$ is represented by the following equation.

$$l_{2,1} = (Lx - l_{1,1}) \times Sx_2y_1 \times k \qquad (2)$$

Similarly, the intensity $l_{1,j}$ of the light diffused by the diffusion pattern of density distribution $Sx_iy_j$ and emitted by each small area as it relates to the light incident from the y direction with an intensity of Ly is represented by the following equation.

$$l_{1,j} = (Lx - \Sigma_{a=1}^{i-1} l_{a,j}) \times Sx_iy_j \times k + (Ly - \Sigma_{b=1}^{j-1} l_{i,b}) \times Sx_iy_j \times k \qquad (3)$$

The average intensity radiated, $l_{ave}$, is represented by the following equation, where n is the number of the small areas in the x axis direction and m is the number of the small areas in the y axis direction.

$$l_{ave} = \Sigma_{i=1}^{n} \Sigma_{j=1}^{m} l_{i,j}/(n \times m) \qquad (4)$$

Keeping the intensity of the light diffused by the diffusion pattern in a fixed range is necessary in order to make the brightness of illumination device 20 uniform. Consequently, the density distribution $Sx_iy_j$ of the diffusion pattern assumed in advance must be compensated and is represented by the following equation.

$$S^1x_iy_j = Sx_iy_j \times l_{ave}/\Sigma l_{i,j} \qquad (5)$$

Just as above, the intensity of the light diffused at each small area using the compensated density distribution $S^1x_iy_j$ of the diffusion pattern is recalculated. If this intensity can be kept within the permitted range, a diffusion pattern with proper brightness uniformity will be generated. If, despite using the once compensated density distribution $S^1x_iy_j$, the intensity of the light is not kept within the fixed range, repeat the compensation with the above technique.

In this way, when the diffusion pattern is generated, based on the intensity of the incident light in both the x and y directions, the intensity of the light emitted by diffusion at each coordinate, or each small area, is calculated for all directions. Along with finding the light intensity emitted at each small area that composes the intensity, the average light intensity is found and the density distribution of the diffusion pattern is compensated so that variations of the light intensity emitted from each small area will be kept within the average light intensity and fixed range.

Further, it is desirable to compensate for the intensity of the light reflected from edge reflective tape 28 which is placed on edges 41a and 41b. For the intensity of the light reflected from edge 41a and 41b by edge reflective tape, it is appropriate to add the intensity of the light that is diffused and emitted to the calculation of $l_{i,j}$, the intensity of light emitted from each small area.

The following is an equation for Lx, the intensity of light reflected from edge 41a in the x direction.

$$Lx' = (Lx - \Sigma_{i=1}^{n} l_{i,j}) \times \eta \qquad (6)$$

In this equation, η is the reflection coefficient of the edge reflective tape. A number, for example, such as 0.5 may be used. Consequently, by performing a further calculation to that discussed above, a density distribution of the diffusion pattern compensated for the edge reflection can be obtained for the light source of the intensity incident from coordinate $x_a$ in the x direction. And, by using diffusion pattern 50 which follows this density distribution, illumination with a high uniform brightness can be achieved through the light guide plate.

FIGS. 12A and 12B show an example of increasing and decreasing the thickness of the light guide plate instead of forming a diffusion pattern that differs in density on the light guide plate. In this example of light guide plate 29, diffusion pattern 51, which has a fixed density distribution, is printed on lower surface 29b. The cross section of light guide plate 29 is formed such that it is inversely proportional to the density distribution of the diffusion pattern discussed above. In other words, edges 41c and 41d of light guide plate 29 are thick and the thickness become gradually thinner in the direction of edges 41a and 41b. When the thickness of light guide plate 29 is thinned in inverse proportion to the density distribution of the diffusion pattern as above, the density of the light, which is illuminated by the diffusion pattern of uniform density formed on lower surface 29b, increases. Consequently, the intensity of the light diffused by diffusion pattern and emitted from upper surface 29a is averaged the same as the light emitted by the diffusion pattern with the density distribution as described above. A light guide plate such as light guide plate 29 shown in FIG. 12 can, therefore, also achieve illumination with high uniform brightness.

Illumination device 20, as explained above, uses as its light source one long fluorescent light that is bent in an L-shape and can be installed at the light guide plate which has a corner removed. Consequently, the effective overall length of the fluorescent light can be extended and the gross luminous energy increased without increasing the number of the driver circuits used for turning on the fluorescent light. Also, when there are a plurality of fluorescent lights, the necessity to adjust such things as the driver circuits so that the brightness of the plurality of fluorescent lights are in agreement does not exist. Further, because the light conversion efficiency can be increased, power consumption can be reduced. In regard to the output of the driver circuit for turning on the fluorescent light, although it is necessary to increase the output ability because the overall length of the fluorescent light is extended, when compared with the case of turning on two fluorescent lights, the output of the driver circuit is still low.

Illumination device 20 can be used in various ways as a surface-type illuminant in addition to the liquid crystal display discussed above. When used to provide backlight in a liquid crystal display panel, the fluorescent light can be arranged in a place opposite to the liquid crystal driver IC because an L-shape fluorescent light is used. For this reason, the effects of heat from the illuminant to the driver IC can be kept to a minimum and a stable display can be obtained. Also, as the illuminant and driver IC have no positional interferences, the size of the liquid crystal display can be reduced. Further, the power consumption of the illumination system is low, the heating power per unit length is low as the illuminating portion is long, and the temperature rise of the liquid crystal panel can, to a great extent, be kept down. Consequently, when high brightness necessary for color displays is shown, color and brightness irregularities of the liquid crystal panel can be prevented and a good quality, vivid color display can be obtained.

Further, to simplify the manufacturing process and obtain a display with uniform illumination and good display quality for the illumination device and the liquid crystal display, many things such as the shape of the reflector and the generation method of the diffusion pattern are improved and a low-cost liquid crystal display with good display quality is provided.

In the above, only one corner from edge 40 of the light guide plate is removed. However, it is also possible to remove all four corners. If all four corners of the same shape are removed, the directionality of the light guide plate becomes unimportant at the time of assembly and the manufacturing process can be further simplified.

EMBODIMENT 2

FIG. 13 shows a liquid crystal display using an illumination device 60, which differs from that described above, and liquid crystal panel 10 installed on illumination device 60. The drawings and descriptions which are substantially similar to the embodiment shown in FIG. 1 are eliminated. Also, the same reference numbers for liquid crystal display panel 10 and other parts that are in common with the first embodiment will be used and the descriptions will be eliminated.

Illumination device 60 uses a U-shaped fluorescent light 62 as a light source. Fluorescent light 62 is positioned next to edges 41a, 41c and 41d on light guide plate 61 of illumination device 60. Illumination device 60 is enclosed within frames 38 and 39, which are upper and lower sections, respectively. Upper frame 38 acts as a spacer to secure the gap between liquid crystal display panel 10 and illumination device 60.

The construction of illumination device 60 of this embodiment will be explained with reference to FIGS. 14 and 15. Within the U-shaped lower frame 39 of illumination device 60 are enclosed the following in the order from bottom to top, reflecting sheet 25, light guide plate 61, diffusion sheet 26, and prism sheet 27. U-shaped fluorescent light 62 is installed next to three of the edges of light guide plate 61, 41a, 41c, and 41d. The remaining edge 41b is attached with edge reflective tape 28. On top of lower frame 39, which encloses all of these, is the flat, U-shaped upper frame 38.

The mirror surface of the hyperbolic curve section of the inner surface 63 of lower frame 39 is formed by silver deposition or the like. The lower surface 64 of upper frame 38 is also silver deposited and mirrorized. The inner surface 63 and lower surface 64 of frames 39 and 38, respectively, function as a reflector. Thus, the reflector and frame described in the previous embodiment are integrated into one part. Consequently, the problems associated with assembling illumination device 60 is further reduced.

The explanation of the functions of reflection sheet 25, diffusion sheet 26, and prism 27 will be omitted as they are the same as that explained in the earlier embodiment. In this example, the pattern sheet is omitted because the diffusion sheet 52 is printed on lower surface 61b of light guide plate 61. The two corners are removed from edges 40a and 40b of light guide plate 61 in order to install U-shaped fluorescent light 62 with an appropriate gap 42 from the light guide plate, as explained in the embodiment above. FIG. 16 shows the relationship between fluorescent light 62 and light guide plate 61. The corner of edge 40b, which is between edges 41c and 41d, and the corner of edge 40a, which is between edges 41a and 41d, are removed so that they do not stick out. In this way, fluorescent light 62 can be installed with fixed gap 42 from edges 41, and the incident efficiency towards light guide plate 61 can be maintained at a high level. Also, damage to fluorescent light 62 caused by thermal expansion, shock etc. can be prevented. The shape of the removed corner, in this example, is a triangle with two sides of approximately equal length. However, as explained earlier, it is also possible to use other shapes.

FIG. 17 shows diffusion pattern 52, which is printed on lower side 61b of light guide plate 61. Diffusion pattern 52 is formed using the density distribution obtained by the generation method discussed above. In this embodiment, because in addition to the light source from edge 41c there is a light source from edge 41a, the area density of the diffusion pattern on this side is low and the area density of the diffusion pattern in the middle of lower surface 61b is high. Also, the area density of the diffusion pattern along edge 41d is low, and the area density of the diffusion pattern opposite to this side near edge 41b is high. Through diffusion pattern 52, the light introduced to light guide plate 61 is diffused and a uniform light is emitted from upper surface 61a of light guide plate 61 towards the liquid crystal display panel.

FIG. 18 shows the temperature distribution on liquid crystal display panel 10 of this embodiment. From this graph it can be seen that the temperature rise of that portion of the panel directly opposite to the fluorescent light increases only about 10 degrees above the regular temperature. As shown in FIG. 22, this is a significant reduction as compared with the temperature rise in a conventional illumination device. Because of the very small difference between the temperature of the central portion of the liquid crystal display panel and the temperature of the edge portions near the light source and the resulting flat temperature distribution, there is a very small amount of image and brightness irregularities that appear on the liquid crystal display panel. Consequently, a good quality image can be obtained. Therefore, illumination device 60 is an illumination device that can irradiate a light of high brightness for color displays and can prevent a temperature rise on the liquid crystal display panel. Because of the use of a long light source bent in a U-shape, the amount of heating per unit length can be reduced and, still further, a reduction in power consumption can be achieved.

In the present embodiment of the liquid crystal display device, as shown in FIG. 13, driver IC 13 is arranged on one of the sides of the U-shaped fluorescent light. However, because the rise in temperature of fluorescent light 62 is small, thermal expansion towards driver IC is small and problems such as fluctuations in the threshold value can be controlled. Consequently, by using the liquid crystal display of this embodiment, a vivid and stable color image with high brightness can be obtained and low power consumption can be achieved. As only one driver circuit is necessary to turn on the fluorescent light, devices that use liquid crystal displays, such as televisions and personal computers, can be miniaturized. Because the discharge length is increased, the driver circuit output must be improved to turn on the U-shaped fluorescent light. However, as compared to turning on three separate fluorescent lights, the increase in the output of the driver circuit is small.

FIG. 19 shows an example of two approximately L-shaped fluorescent lights 72a and 72b installed on light guide plate 71. FIG. 20 shows three approximately L-shaped fluorescent lights 82a, 82b, and 82c installed on hexagonal light guide plate 81. The corners are removed from the edge portions 40 of both light guide plates 71 and 81 so that there is no interference with fluorescent lights 72 and 82 and these lights can be properly positioned. Structures discussed in the above embodiments, such as those of the reflectors, can also be used here.

Various shapes of surface-type illumination systems can be formed using a bent, cylindrical illuminant. With these illumination devices, a uniform illumination device with high brightness can be obtained that has low power consumption. Also, a high quality color display can be obtained when a color liquid crystal display panel is used.

The surface-type illumination device of the invention is suitable for providing backlight in liquid crystal display devices that use a liquid crystal display panel or for using as other flat, surface-type illumination devices. Because liquid crystal display devices using this illumination device can display vivid color with low power consumption, it can be used as a display in notebook PCs and other information processing devices as well as in devices such as liquid crystal TVs, video cameras, and other image processing devices.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An illumination device comprising:

a substantially transparent and polygon-shaped light guide plate comprising at least first and second side edges;

an elongated illuminant comprising an L-shaped section facing said at least first and second side edges of said light guide plate;

said light guide plate comprising a cutout portion at a corner between said first and second side edges so as not to interfere with a facing bend in said L-shaped section of said elongated illuminant;

said cutout portion comprising a first leg and a second leg, said first leg being substantially parallel to said second side edge, and said second leg being substantially parallel to said first side edge.

2. An illumination device according to claim 1 comprising a gap distance in a range of about 0.8 to 1.5 mm formed between at least one of said first and second side edges and said facing illuminant.

3. An illumination device according to claim 2 wherein said gap distance is in a range of about 1.0 to 1.5 mm.

4. An illumination device according to claim 1 wherein an aperture ratio, defined as a thickness of said light guide plate/a diameter of said illuminant, is in the range of about 0.9 to 2.0.

5. An illumination device according to claim 1 further comprising a reflecting member covering said cutout portion.

6. An illumination device according to claim 1 wherein the length of one of said first and second legs is approximately 0.6 times to 1.0 times the smallest radius of curvature of said facing bend in said L-shaped illuminant.

7. An illumination device according to claim 1 further comprising a reflector covering said illuminant except in regions of said illuminant facing said first and second side edges of said light guide plate, said reflector comprising a first reflector portion and a second reflector portion positioned along legs of said L-shaped section of said illuminant.

8. An illumination device according to claim 1 further comprising a reflector covering said illuminant except in regions of said illuminant facing said first and second side edges of said light guide plate, said reflector comprising a first portion covering a lower portion of said illuminant and a second portion covering an upper portion of said illuminant.

9. An illumination device according to claim 1 wherein said light guide has a thickness formed so that it is inversely proportional to a density distribution calculated by:

computing a first predicted emitted light intensity distribution for a first direction along said first side edge based on the intensity of the light incident on said light guide plate from said second side edge and the density distribution of a presupposed diffusion pattern;

computing a second predicted emitted light intensity distribution for a second direction along said second side edge based on the intensity of the light incident on said light guide plate from said first side and the density distribution of the presupposed diffusion pattern; and computing the density distribution of said diffusion pattern by compensating the density distribution of the presupposed diffusion pattern so that the sum of said first predicted emitted light intensity distribution and said second predicted emitted light intensity distribution on arbitrary rectangular coordinates of said light guide plate fit within a fixed range.

10. An illumination device according to claim 9 further comprising an edge reflector disposed along at least one of two side edges of said light guide plate opposite to said first side edge and said second side edge, said edge reflector reflecting the light emitted by said light guide plate back to said light guide plate; and the density distribution of said diffusion pattern is computed by:

computing an intensity of light reflected by said edge reflector and incident on said light guide plate with a fixed attenuation factor;

computing a predicted emitted light intensity distribution for at least one of the first and second directions for said reflected light intensity; and adding the predicted emitted light intensity distribution to the sum of said first predicted emitted light intensity distribution and said second predicted emitted light intensity distribution which are on arbitrary rectangular coordinates of said light guide plate.

11. An illumination device according to claim 1 further comprising a liquid crystal display that is illuminated by light emitted from one side of said light guide plate by a diffusion pattern formed on the other side of said light guide plate; and a driver that drives said liquid crystal display, said driver arranged along two side edges of said light guide plate opposing said first and second side edges of said light guide plate.

12. An illumination device according to claim 1 wherein said illuminant is substantially U-shaped and faces said first and second side edges and a third side edge of said light guide plate.

* * * * *

UNITED STATES PATENT AND TRADEMARK OFFICE
CERTIFICATE OF CORRECTION

PATENT NO.   : 6,108,060
DATED        : August 22, 2000
INVENTOR(S)  : Tatsuaki Funamoto et al.

It is certified that error appears in the above-identified patent and that said Letters Patent is hereby corrected as shown below:

On the title page, item 30, Foreign Application Priority Data, please add --July 13, 1992 [JP] Japan 4-184976--.

Signed and Sealed this

Twenty-ninth Day of May, 2001

*Attest:*

NICHOLAS P. GODICI

*Attesting Officer*      Acting Director of the United States Patent and Trademark Office